United States Patent
Yee

(10) Patent No.: US 8,996,988 B2
(45) Date of Patent: Mar. 31, 2015

(54) AUTOMATED APPLICATION COMPATIBILITY TESTING

(75) Inventor: Jeffrey S. Yee, Bellevue, WA (US)

(73) Assignee: Browsera, LLC, Kirkland, WA (US)

( * ) Notice: Subject to any disclaimer, the term of this patent is extended or adjusted under 35 U.S.C. 154(b) by 1564 days.

(21) Appl. No.: 12/581,772

(22) Filed: Oct. 19, 2009

(65) Prior Publication Data

US 2011/0093773 A1 Apr. 21, 2011

(51) Int. Cl.
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 17/30 | (2006.01) |

(52) U.S. Cl.
CPC .... *G06F 17/30896* (2013.01); *G06F 17/30905* (2013.01)
USPC .......................................... 715/235; 715/234

(58) Field of Classification Search
USPC ................................................. 715/234, 235
See application file for complete search history.

(56) References Cited

U.S. PATENT DOCUMENTS

| 6,081,816 | A | * | 6/2000 | Agrawal | 715/210 |
| 7,757,175 | B2 | * | 7/2010 | Miller | 715/738 |
| 7,971,137 | B2 | * | 6/2011 | Jindal et al. | 715/234 |
| 8,069,407 | B1 | * | 11/2011 | Armandpour et al. | 715/234 |
| 2005/0262430 | A1 | * | 11/2005 | Croft | 715/507 |
| 2006/0253777 | A1 | * | 11/2006 | Yalovsky | 715/530 |
| 2009/0037841 | A1 | * | 2/2009 | Bell et al. | 715/788 |
| 2010/0211893 | A1 | * | 8/2010 | Fanning et al. | 715/760 |
| 2010/0313149 | A1 | * | 12/2010 | Zhang et al. | 715/760 |
| 2011/0035661 | A1 | * | 2/2011 | Balinsky et al. | 715/243 |

* cited by examiner

*Primary Examiner* — Kyle Stork
*Assistant Examiner* — Nicholas Hasty
(74) *Attorney, Agent, or Firm* — Judy Kadoura

(57) ABSTRACT

A hardware and/or software facility for automated application compatibility testing. The facility automatically detects visual discrepancies between rendered versions of a web page produced by different browsers. The facility may identify differences in a web page rendered by two or more browsers by progressively comparing, for each browser, the corresponding visual elements of the web page without comparing the elements to any predetermined expected results. The facility may identify functional differences in the web page across the tested browsers. The facility generates a human-readable report of the visual and/or functional differences between the tested browsers.

22 Claims, 15 Drawing Sheets

```
0001  <html>
0002    <head>
0003      <style>
0004        #header {
0005          border: 2px solid; }
0006        #nav {
0007          border: 2px solid;
0008          width: 46px;
0009          float: left; }
0010        #content {
0011          border: 2px solid;
0012          width: 346px;
0013          float: left; }
0014        #footer {
0015          border: 2px solid;
0016          clear: both; }
0017        #wrapper {
0018          border: 2px solid;
0019          width: 400px; }
0020      </style>
0021    </head>
0022    <body>
0023      <div id="wrapper">
0024        <div id="header">Site Header</div>
0025        <div id="nav">Left Nav withverylongandunbreakabletextstring</div>
0026        <div id="content">This is where my main text goes.</div>
0027        <div id="footer">Site Footer</div>
0028      </div>
0029    </body>
0030  </html>
```

FIG. 3

```
                            Firefox-3.dom.xml                    – □ ×
0001  <html display='block' elementId='0' absoluteLeft='0' offsetHeight='768' offsetLeft='0' offsetTop='0' offsetWidth='1024' absoluteTop='0'
0002  visibility='visible' text='#header {
0003  /*backgro' startDate='Thu Sep 17 2009 17:09:14 GMT-0700 (Pacific Daylight Time)'>
0004    <body display='block' elementId='1' absoluteLeft='0' offsetHeight='116' offsetLeft='0' offsetTop='0' offsetWidth='1008'
0005  absoluteTop='0' visibility='visible' text='Site Header
0006  Left Na'>
0007    <div display='block' elementId='2' id='wrapper' absoluteLeft='8' offsetHeight='116' offsetLeft='8' offsetTop='8'
0008  offsetWidth='404' offsetParent='BODY' absoluteTop='8' visibility='visible' text='Site Header
0009  Left Na'>
0010      <div display='block' elementId='3' id='header' absoluteLeft='10' offsetHeight='24' offsetLeft='10' offsetTop='10'
0011  offsetWidth='400' offsetParent='BODY' absoluteTop='10' visibility='visible' text='Site Header'>
0012      </div>
0013      <div display='block' elementId='4' float='left' id='nav' absoluteLeft='10' offsetHeight='64' offsetLeft='10'
0014  offsetTop='34' offsetWidth='50' offsetParent='BODY' absoluteTop='34' visibility='visible' text='Left Nav withverylongandu'>
0015      </div>
0016      <div display='block' elementId='5' float='left' id='content' absoluteLeft='60' offsetHeight='60' offsetLeft='60'
0017  offsetTop='34' offsetWidth='350' offsetParent='BODY' absoluteTop='34' visibility='visible' text='This is where my main tex'>
0018      </div>
0019      <div display='block' elementId='6' id='footer' absoluteLeft='10' offsetHeight='24' offsetLeft='10' offsetTop='98'
0020  offsetWidth='400' offsetParent='BODY' absoluteTop='98' visibility='visible' text='Site Footer'>
0021      </div>
0022    </div>
0023    </body>
0024  </html>
```

FIG. 5A

```
Internet-Explorer-7.dom.xml
0001  <html display='inline' elementId='0' absoluteLeft='-2' offsetHeight='768' offsetLeft='0' offsetTop='0' offsetWidth='1024' absoluteTop='-2'
0002  visibility='visible' hasLayout='false' text='Site HeaderLeft Nav withv' textBefore='true' startDate='Thu Sep 17 17:09:02 PDT 2009'>
0003    <body display='block' elementId='1' absoluteLeft='0' offsetHeight='768' offsetLeft='0' offsetTop='0' offsetWidth='1024' overflow-
0004  x='auto' overflow-y='scroll' absoluteTop='0' visibility='visible' hasLayout='true' text='Site HeaderLeft Nav withv'>
0005      <div display='block' elementId='2' id='wrapper' absoluteLeft='8' offsetHeight='134' offsetLeft='10' offsetTop='15'
0006  offsetWidth='400' offsetParent='BODY' absoluteTop='13' visibility='visible' hasLayout='true' text='Site HeaderLeft Nav withv'>
0007        <div display='block' elementId='3' id='header' absoluteLeft='10' offsetHeight='23' offsetLeft='0' offsetTop='0'
0008  offsetWidth='396' offsetParent='DIV' absoluteTop='15' visibility='visible' hasLayout='false' text='Site Header'>
0009        </div>
0010        <div display='block' elementId='4' float='left' id='nav' absoluteLeft='10' offsetHeight='61' offsetLeft='0'
0011  offsetTop='23' offsetWidth='230' offsetParent='DIV' absoluteTop='38' visibility='visible' hasLayout='true' text='Left Nav
0012  withverylongandu'>
0013        </div>
0014        <div display='block' elementId='5' float='left' id='content' absoluteLeft='10' offsetHeight='23' offsetLeft='0'
0015  offsetTop='84' offsetWidth='346' offsetParent='DIV' absoluteTop='99' visibility='visible' hasLayout='true' text='This is where my main
0016  tex'>
0017        </div>
0018        <div display='block' elementId='6' id='footer' absoluteLeft='10' offsetHeight='23' offsetLeft='0' offsetTop='107'
0019  offsetWidth='396' offsetParent='DIV' absoluteTop='122' visibility='visible' hasLayout='false' text='Site Footer'>
0020        </div>
0021      </div>
0022    </body>
0023  </html>
```

FIG. 5B

LCS.txt

0001 LCS of Internet-Explorer-7.dom.xml and Firefox-3.dom.xml
0002
0003 html
0004 body
0005 div#wrapper
0006 div#header
0007 div#nav
0008 div#content
0009 div#footer
0010
0011
0012
0013
0014
0015
0016
0017
0018
0019
0020
0021
0022
0023
0024
0025
0026
0027

FIG. 6

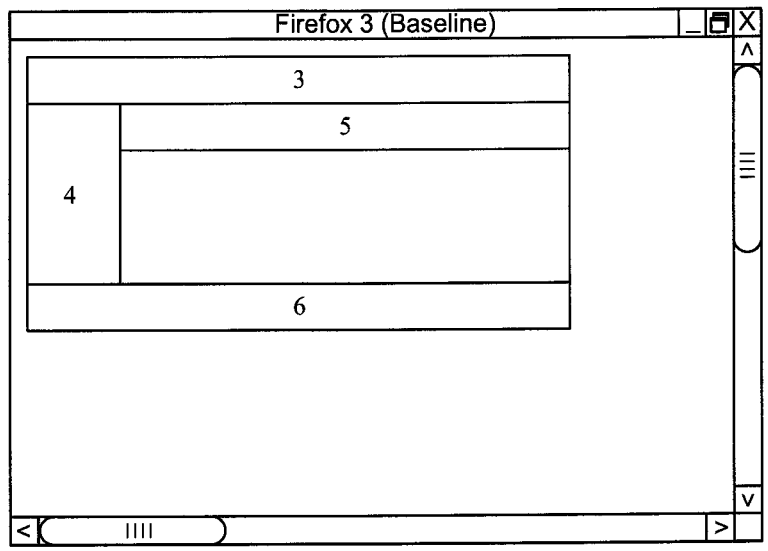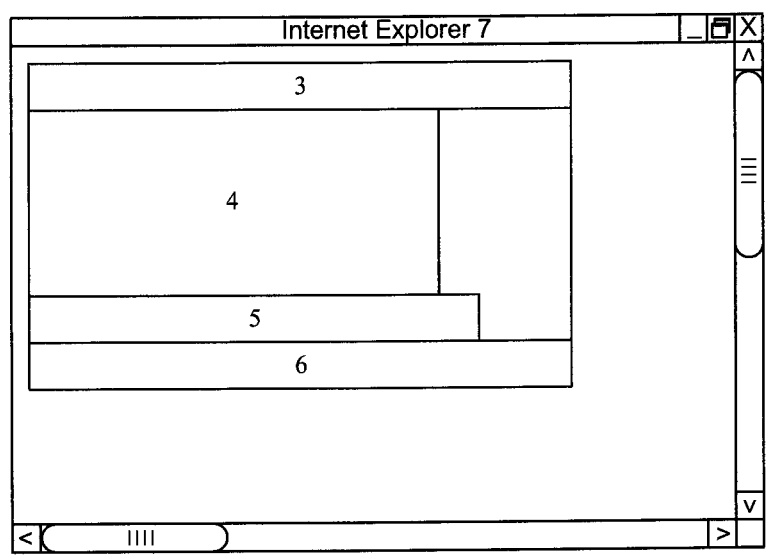
FIG. 7

FIG. 8

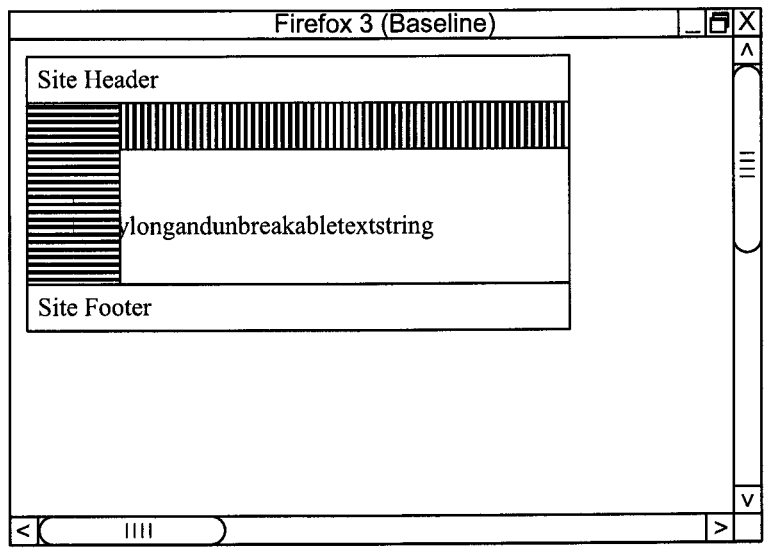
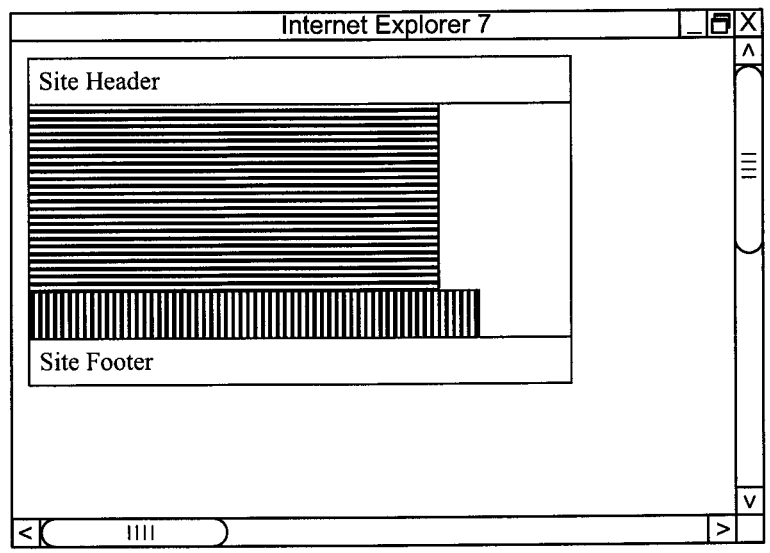
FIG. 9

AUTOMATED APPLICATION COMPATIBILITY TESTING

BACKGROUND

The Internet has become an increasingly important source for information and applications, and the world wide web is the primary method of access. Content is served via web pages which are implemented using a combination of markup and scripting languages, such as Hypertext Markup Language (HTML) and JavaScript. Web pages are accessed by users via various browser applications. Examples of browsers include Internet Explorer, Firefox, Safari, Chrome, Opera, and so on.

Authors of web pages must take care to ensure that pages they create are compatible with their users' browsers. However, adhering to web standards such as HTML and Cascading Style Sheets (CSS) is not sufficient to ensure compatibility. The reasons for this are numerous. For example, some browsers support only a subset of these web standards. As another example, implementations of the standards are inconsistent across browsers. Also, the standards' specifications can be open to interpretation of the implementing party. In addition, the standards continue to evolve and change.

Validation of web pages for browser compatibility is often a tedious, expensive, and error prone process. There are numerous browser applications and operating system platforms, and test engineers test their web pages on each browser/operating system combination. Typically, to test a web page on each browser and operating system, a test engineer must configure and maintain a multitude of computers. Then, each test must be executed on each combination. Care must be taken to ensure the initial state of each browser and that the exact same test steps are followed. Then, the results of each test must be inspected manually to determine correctness.

One important aspect of correctness is ensuring that the web page layout of each page is visually consistent between different browsers. Detecting page layout inconsistencies across different browsers is an especially difficult problem. Due to the above-mentioned variation in browser and operating system implementations, it is extremely difficult to efficiently author content that renders the same across them. Thus, human judgment must be exercised to determine if the resulting page layout is acceptable.

BRIEF DESCRIPTION OF THE DRAWINGS

One or more embodiments of the facility are illustrated by way of example and not limitation in the figures of the accompanying drawings, in which like references indicate similar elements and in which:

FIG. 3 is an example HTML source document that gives rise to at least one collinearity discrepancy when rendered by two different browsers.

FIGS. 5A-5B illustrate canonical representations of the DOMs structures within the browsers illustrated in FIG. 4.

FIG. 6 illustrates a list of common elements calculated between elements from the canonical representations of the DOMs illustrated in FIGS. 5A and 5B.

FIG. 7 is an example of a collinearity diagram.

FIG. 8 illustrates an example discrepancy data structure listing at least one unacceptable collinearity difference identified in FIG. 7.

FIG. 9 is an example of augmented screenshots highlighting the collinearity difference listed in the discrepancy data structure illustrated in FIG. 8.

DETAILED DESCRIPTION

Figure 1:
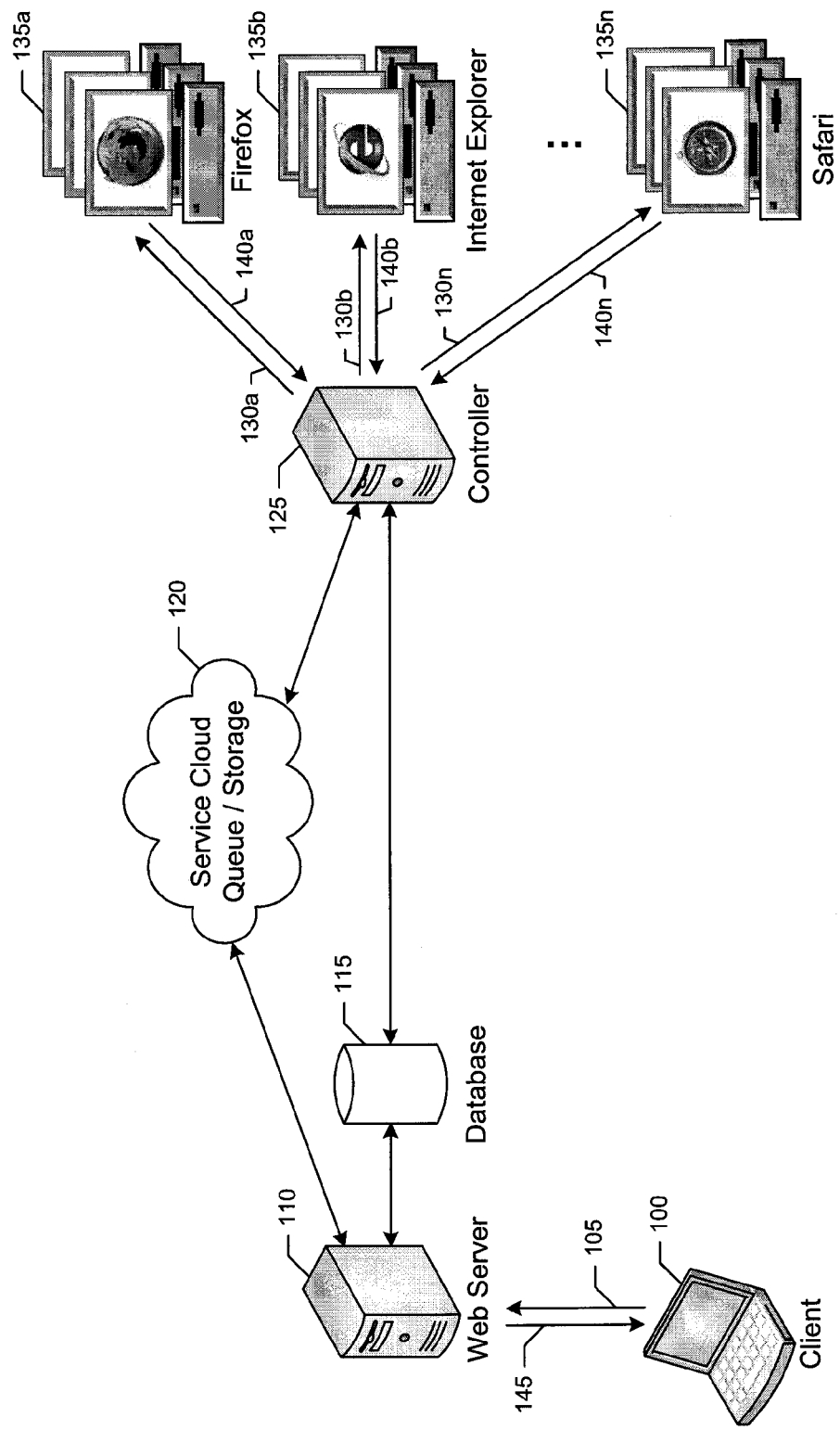
FIG. 1 is a data flow diagram of various computer systems that are part of, or interact with, the facility.

The inventor has observed that no automated system exists to determine if web page layout is acceptable across browser platforms. Accordingly, an automated application compatibility testing facility has been developed to automatically detect and report visual discrepancies between the rendered versions of a web page produced by different browsers. In some embodiments, the facility determines if a web page layout is acceptable by first navigating to the page in each tested browser. After the page has completed loading, the facility requests layout information of the elements contained in the page. This information is compared using heuristics to detect visual discrepancies. Discrepancies beyond a certain threshold are recorded and presented to the user. Thus, time is saved in determining if the web page has an acceptable and/or consistent layout across multiple browsers.

In some embodiments, the facility identifies differences in a web page rendered by two or more browsers by progressively comparing, for each browser, the corresponding visual elements of the web page without comparing the elements to any predetermined expected results. In addition to, or independent from, the visual element comparisons, the facility may identify functional differences in the web page across the tested browsers. In some embodiments, the facility generates a human-readable report of the visual and/or functional differences between the tested browsers. In this description, it is noted that the terms "differences" and "discrepancies" and variations of these terms are used interchangeably to facilitate description.

In some embodiments, to facilitate description, the facility is described in the context of testing a web page loaded by different browsers. However, the facility may be used to test other types of applications, application programming interfaces (APIs), device drivers, operating systems, and/or the like (collectively referred to herein as "applications"). As such, references to browsers should not be taken as restrictive. As used herein, the term "application" is used to refer to a particular version or release of an application that may be platform-independent or developed for one or more versions or releases of an application platform (e.g., operating system) and/or one or more hardware configurations.

In conventional systems, as the functionality of an application is developed, it is often tested with ad-hoc procedures by the authoring developer. However, developers generally only verify the functionality of the application across a subset of the supported application platforms, hardware configurations, etc. (referred to herein as "supported installations") on which the developed application is expected to operate consistently—generally only the most convenient or fastest platforms/configurations/versions. Moreover, many of the tests performed during development of an application are not implemented as formal tests to be run against all of the installations allegedly supported by the application.

In some embodiments, the facility leverages the informal testing performed during the development phase of an application to expand the test coverage of the application. By comparing the output of the application on each supported installation, a developer may quickly determine whether the application is (at least) behaving consistently across the supported installations irrespective of any predetermined expected result. As used herein, the term "predetermined expected result" is used to refer to the correct (or accepted) outputs of an application, which are produced by a user or an application outside of the facility. Although predetermined expected results may be supplied to the facility for further processing, the facility identifies differences in the tested installations of an application without regard to any predetermined expected result. For example, each tested installation of an application may produce the same incorrect result. In some embodiments, if each tested installation of an application produces the same (or a substantially similar) incorrect result, the facility reports that no discrepancies were identified between the tested installations. As a result, if the application behavior is consistent, a developer need only examine the output of a tested installation to determine whether the application behavior is both consistent and correct (or acceptable). If the application behavior is inconsistent, the developer may quickly identify the supported installations that produce outputs differing from the majority of the tested installations (or from a selected installation). In some embodiments, if no discrepancies are identified, the facility automatically selects the output of a tested installation and compares the selected output to predetermined expected results supplied to the facility. The facility may generate a report of the identified discrepancies (if any), the number of tested installations satisfying the predetermined expected results supplied to the facility, and/or other information. By indicating the number of installations that differ from the majority of installations (or from a selected installation), the facility provides the developer with metrics indicating the consistency or compatibility of the application for the supported installations irrespective of the number of the tested installations that produced the "correct" or an "acceptable" result. In some embodiments, the facility may also generate a report identifying the tested installations or number of tested installations having output differing from predetermined expected results supplied to the facility.

Before describing the facility in greater detail, it is useful to consider an environment in which the technology can be implemented. FIG. 1 is a data flow diagram of various computer systems that are part of, or interact with, the facility in some embodiments. In the illustrated embodiment, a client computer 100 submits a request 105 to a web server 110 through a network (not shown), such as the Internet or a local area network. In operation, the client computer 100 may submit a request 105 to the web server 110 by exchanging packets of information over a network. For example, the client computer 100 may issue a request 105 using the Hypertext Transfer Protocol (HTTP) over TCP/IP. The client computer 100 may be, for example, a personal computer, workstation, server, or the like. When operated by a user, the client computer 100 typically includes a browser and/or another software application that enables the user to access services and/or data provided by the facility via the web server 110. Details regarding web servers and client computers are known and well documented, and thus need not be described in detail in order to gain an understanding of the operation of the facility.

In some embodiments, the request 105 identifies or comprises a set of pages to be tested. To facilitate description, the term "set of pages" is used to refer to a single page, multiple pages, or the like, which may be examined by the facility across two or more browsers. A request 105 may identify a set of pages previously examined by the facility. For example, a request 105 may specify a unique identifier corresponding to a stored set of pages. As another example, example, a request 105 may include an identifier for one or more pages included in the set (e.g., a Universal Resource Locator (URL), pointer, etc.), the source code of one or more pages included in the set, and/or any combination of such information that may be used by the facility to examine the set of pages.

In some embodiments, the request 105 identifies the browsers to be tested (e.g., Internet Explorer 7 (IE7) and Firefox 3). As used herein, the term "browser" is used to refer to a particular version or release of a browser (e.g., Firefox 3) that is platform-independent or developed for one or more versions or releases of an operating system and/or one or more hardware configurations (e.g., Safari 4 running within Windows XP or Windows Vista on a device having at least a 500-MHz Pentium-class processor and 256 MB of RAM). It is noted that the facility is designed to examine pages produced by a wide variety of browsers. As such, references to particular browsers should not be taken as restrictive. In some embodiments, the facility provides an extensible framework, so that facility may be easily extended to include new browsers that are developed.

In some embodiments, the request 105 identifies which of the tested browsers is to be selected as a "baseline" or "reference" browser for the set of pages. When a browser is selected as a baseline browser, its output is used as a basis for comparison against the output of the other tested browsers. If no baseline browser is specified, a baseline browser may be selected at random and/or based on a comparison of the output of the tested browsers. For example, if a majority of tested browsers produce substantially the same output, a browser may be selected from the majority as the baseline browser and its output is used as the basis for comparison to the output produced by the other tested browsers. In some embodiments, if a browser is specified as a baseline browser and the output produced by that browser is not substantially similar to the output produced by the majority of the tested browsers, the facility automatically selects a browser from the majority to replace the specified browser. The facility may notify the client 100 from which the request 105 was received of the substitution.

In some embodiments, the request 105 includes an option to crawl one or more of the pages in the set. For example, if selected, the option may specify a page depth (e.g., 5 pages) to be crawled for each identified page. When a web page is crawled, links to other web pages are discovered and put in a queue to be processed and/or crawled in accordance with the specified page depth. In some embodiments, the request 105 includes an option to examine one or more of the pages for scripting errors. Scripting errors are identified by monitoring the tested browsers' error consoles. Discrepancies in scripting errors are reported. In some embodiments, all scripting errors are reported even if the same or a substantially similar scripting error is reported by each of the tested browsers.

In some embodiments, the request 105 identifies and/or includes one or more functionality tests. For example, a functionality test may include one or more commands that are executed prior to, or after, the page comparisons. Command execution may be execution of a binary, code from a testing framework, a JavaScript method, and so on. For example, a request 105 may include commands to populate form fields on a page to log in to an application, or to open an application dialog, and so on. It is noted that the request 105 may also include other information not specifically mentioned herein.

In some embodiments, the facility enables a user operating a client computer 100 to establish an account with the facility. The facility may store information associated with a plurality of accounts in database 115 and/or another data store. Such information may include, for example, an account name, one or more authorized users of the account, a default selection of the browsers to be tested, a default baseline browser, a default page depth to be crawled, a default page resolution, domain credentials to authenticate a browser under the control of the facility, payment information, and/or other information not specifically mentioned herein.

In some embodiments, a user's account information includes or identifies at least one stored set of pages to be examined by the facility. The stored set of pages may include one or more pages frequently or previously examined by the facility. In some embodiments, a user's account information includes or identifies at least one stored functionality test that is associated with a page to be examined by the facility. Stored functionality tests may or may not have predetermined expected results. In some embodiments, a user's account information may specify that the facility is to examine a stored set of pages irrespective of whether a request 105 is received that identifies or comprises the set of pages. For example, the facility may examine one or more sets of pages in accordance with the user's account information on a periodic basis (e.g., nightly, weekly, monthly, etc.), according to a defined release schedule, when a threshold number of changes have been made to pages included in the sets, during periods of low activity, and/or the like. The facility may examine a stored set of pages for presentation discrepancies, layout discrepancies, script error discrepancies, functional discrepancies, and/or the like.

Returning to FIG. 1, in response to receiving a request 105, the web server 110 records test information from the request in a database 115 and queues a test entry, for example, using a queuing service (e.g., Amazon Simple Queue Service (SQS)) of a service cloud 120. In the illustrated embodiment, the service cloud 120 is a collection of web services offered over a network by a service provider. The service cloud 120 may be operated and/or controlled by the same entity or a different entity as the facility. For example, the service cloud 120 may be provided by a third-party web service, such as Amazon Web Services (AWS), Google App Engine, Windows Azure Platform Services, Blue Cloud, Rackspace, and/or the like.

In some embodiments, the web server 110 notifies a controller 125 when a test entry is queued. In some embodiments, the controller 125 polls a queue of the service cloud 120 for tests waiting to execute. For example, the controller 125 may poll the service cloud queue on a sporadic basis, on a periodic basis, when a threshold number of test entries is reached, in response to a notification, during periods of low activity, and so on. Upon receiving a test entry, the controller 125 accesses the test information associated with the test entry that is stored in the database 115. The controller 125 may also access other information associated with the test entry or user account, such as error thresholds or results from prior tests. The controller 125 then processes the test entry by sending messages 130a . . . 130n to one or more physical or virtual machines executing the browsers 135a, 135b, . . . 135n identified in the test information. The machines and browsers may be initialized on-demand or always running. A message 130 may be a command to load a page, capture a screenshot of a loaded page, query the browser console for script errors, execute code, and so on.

In some embodiments, one or more of the tested browsers 135a, 135b, . . . 135n is authenticated by a third-party web server (not shown) prior to accessing/loading a page hosted by the third-party web server. For example, a third-party web server may redirect a browser 135 to a login page in response to receiving a request from the browser 135 to retrieve a page hosted by the third-party web server. In some embodiments, a browser 135 under the control of the facility is authenticated by submitting appropriate credentials (e.g., username, password, token, etc.) to the third-party web server or another authentication server. Such credentials may be specified in the request 105 associated with the test entry and/or specified by account information associated with the test entry. Details regarding authentication are well known and well documented, and thus need not be described in detail in order to gain an understanding of the operation of the facility.

In some embodiments, a token (not shown) is generated in response to a browser 135 being authenticated. For example, the token may be generated by the facility, the third-party web server, or the like. The token may be valid for a specified period of time (e.g., 6 hours). As a result, subsequent page retrieval requests that are made within the specified period of time and that include the token do not require the browser 135 to log in again. The token may be valid for a specified scope to enable the browser 135 to access data hosted by the third-party web server and/or other servers (e.g., one or more domains, sub-domains, paths, etc.). The token may be shared by two or more of the browsers 135a, 135b, . . . 135n. As a result, in some embodiments, only one of the browsers 135 is required to complete the authentication procedure prior to accessing/loading the set of pages. In some embodiments, in addition to authenticating a browser 135, the token specifies various information that may be used by the third-party web server to respond to received page requests. For example, the token may identify a browser resolution of the requesting browser 135. One or more browser resolutions may be specified in the request 105 associated with the test entry and/or a default browser resolution may be associated with the test entry based on the account information of the user.

The browsers 135a, 135b, . . . 135n may be directly controlled by the controller 125 or may be controlled by one or more corresponding browser drivers (not shown). The controller 125 and/or the corresponding browser driver may communicate with the browser 135 via a suitable protocol appropriate to the browser, such as COM, XUL, or AppleScript. Each browser executes the command and returns a result 140 to the corresponding browser driver and/or the controller 125. The results 140a . . . 140n are received and processed by the controller 125. The controller 125 examines the results for discrepancies between the tested browsers as described further herein. For example, such discrepancies may include: layout inconsistencies, presentation inconsistencies, scripting errors inconsistencies, functionality inconsistencies, and/or the like. The controller 125 records the identified discrepancies in the database 115 and generates a human-readable report (not shown) of the identified discrepancies. In some embodiments, some or all of the generated report is stored by the service cloud 120 using a storage service of the service cloud 120 (e.g., Amazon Simple Storage Service (S3)). The web server 110 then returns the results 145 (e.g., the generated report) to the client 100.

In some embodiments, the generated report comprises a list of the browsers 135 that produced output that differed from the output produced by the baseline browser and/or the identified discrepancies. The generated report may list an identified discrepancy by one or more unique selectors which, in the context of presentation and/or layout discrepancies, correspond to an element or a set of elements to which the identified discrepancy is attributed. The element or set of elements may be produced by the controller 125 (or by a corresponding browser driver) traversing a Document Object Model (DOM) generated by a browser 135 from a loaded page. An identified discrepancy may include a description of the difference. For example, a description of an identified discrepancy may indicate that two elements of a page rendered in a browser do not have the same, or an acceptable, collinearity property (e.g., top edge collinearity) when compared with the same elements of the same page rendered by another browser (e.g., the baseline browser). The description of an identified discrepancy may include position information of the element or set the elements to which the identified discrepancy is attributed. Position information of an element may be obtained by querying the DOM generated by a browser from the loaded page. Such position information may include, for example, one or more offsets of the element (e.g., offsets between the element and the root element of the loaded page, offsets between the element and its parent, siblings, children, etc.), the height of the element, the width of the element, and/or the like. Similarly, a description of an identified discrepancy may include the positioning mode of an element or a set of elements to which the discrepancy is attributed (e.g., any applied styles that control the visibility of the element or set of elements).

In some embodiments, the generated report comprises two or more augmented screenshots of a page. For example, the controller 125 may augment screenshots produced by the browsers 135 (or a corresponding browser driver) to highlight visual discrepancies between two or more rendered versions of a page produced by the different browsers. Visual discrepancies may be highlighted in a variety of ways. For example, the controller 125 may draw a box, a circle, or another suitable shape around the element or set of elements to which an identified discrepancy is attributed. The color, line weight, fill (e.g., transparency, pattern, etc.), etc. of such shapes may be selected based on the display characteristics of the page and/or the elements to be highlighted. For example, if an element to which a discrepancy is attributed is a dynamic element (e.g., an advertisement), the controller 125 may fill the element with a noticeable opaque pattern or color to indicate that the actual content displayed by the element is immaterial to the visual discrepancy of the element produced by the different browsers. By filling a dynamic element, a user viewing the augmented screenshot is less likely to be confused or distracted by the possible content differences between the rendered versions of the web page produced by the different browsers.

In some embodiments, to highlight an element or a set of elements, the controller 125 selects a color, line weight, and/or fill that is complementary to the most prominent colors displayed on the page. For example, if the most prominent color on a web page is blue, the controller 125 may highlight an element by outlining the element in orange (blue and orange are complementary colors). In some embodiments, an augmented screenshot may highlight two or more identified discrepancies. The element or set of elements attributed to each identified discrepancy may be highlighted using a unique style (e.g., combination of color, line weight, fill, shape, and/or the like). In some embodiments, if a unique style is used to highlight an element or a set of elements in a captured screenshot and the same elements are highlighted in another captured screenshot of the same page rendered by a different browser, the same styles are used to highlight the inconsistencies of the same elements. By consistently highlighting each uniquely identifiable element/discrepancy in the screenshots of a page produced by different browsers, a user viewing the augmented screenshots is able to quickly and efficiently spot the visual discrepancies in the page produced by the different browsers, thereby reducing the time spent by users to determine whether a page has an acceptable presentation and/or layout across multiple browsers.

In some embodiments, the generated report includes an interface to overlay two or more of the augmented screenshots of a page. For example, the facility may superimpose an augmented screenshot of a page loaded in the baseline browser on top of an augmented screenshot of the paged loaded in another tested browser, or vice versa. The superimposed screenshot may have a transparency effect applied to the screenshot, so that a user viewing the overlaid screenshots can more accurately visualize the positioning discrepancies of the highlighted elements. The generated report may include controls to enable a user viewing the augmented screenshots to measure characteristics of the highlighted elements to which the discrepancies are attributed.

In some embodiments, the facility enables a user to classify ("triage") discrepancies identified by the facility. For example, in some embodiments, the generated report includes an interface to tag various discrepancies for additional processing. For example, a user may tag an identified discrepancy to indicate that the discrepancy is a known bug. If the same discrepancy is subsequently identified by the facility, the discrepancy may be highlighted in the generated report in a different manner (e.g., using a different color, pattern, etc. associated with known, unresolved bugs), listed in a separate "unresolved bug report," ignored, and so on. As another example, a user may tag an identified discrepancy to indicate that the discrepancy is not a bug. In some embodiments, if an identified discrepancy is tagged as not a bug, the user may further specify how the discrepancy is to be handled for other pages within the received set that include the same discrepancy and/or future tests of the same page or set of pages. For example, the user may specify that an identified discrepancy is to be disregarded for only the page on which it was identified, all pages in the received set, all or a subset of the pages within a domain, and/or the like. As another example, the user may indicate that the identified discrepancy is to be disregarded for only the current test entry, sets of pages examined by the facility within a specified time period, all future test entries, and/or the like. Other tags not specifically mentioned herein may be provided by the facility. In some embodiments, the facility enables users to define user-specific tags and any associated rules of the tag.

In some embodiments, the facility maintains a page history for one or more pages in a received set. For example, the facility may maintain a page history for any number of pages (e.g., a single page, a selected group of pages, each page in a received set, crawled pages, etc.). A page history may include a number of instances of the page at different points in time. For example, a page history may include one or more augmented screenshots of the page rendered in the default baseline browser and/or different browsers, information describing presentation discrepancies identified for two or more browsers, information describing layout discrepancies identified for two more browsers, information describing scripting error discrepancies identified for two or more browsers, information describing functional test discrepancies identified for two or more browsers, one or more canonical representations of the DOM produced by one or more corresponding browsers from the loaded page, and/or the like. It is noted that a page history may include other information not specifically mentioned herein.

In some embodiments, the facility provides an interface to enable a user to select the quantity and/or type of information stored in a page history. For example, a user may instruct the facility to store only the augmented screenshots of a page. As another example, a user may instruct the facility to include in the page history only the canonical representations of DOMs generated by browsers for which discrepancies with the baseline browser are reported.

In some embodiments, the facility includes a default page history value that specifies the number of page instances maintained by the facility for a page. The facility may notify a user when the default number is reached and/or discard instances of the page when the default value is exceeded. The facility may discard instances of a page based on a variety of factors, such as the date/time on which the page instance was generated or stored, whether duplicate instances of the page were recorded at different points in time, and so on. For example, the facility may favor discarding duplicate or substantially similar page instances rather than discarding the oldest instance of a page. In some embodiments, the facility provides an interface that enables a user to select and/or rank the factors used to determine which page instance to discard. In some embodiments, the number of page instances maintained by the facility for a page is specified by a user. For example, a user may request that the number of page instances maintained by the facility be increased or decreased for one or more pages (e.g., frequently test and/or modified pages). In some embodiments, the facility charges a fee to maintain page histories and/or when the number of pages instances maintained by the facility exceeds the default value. The fee may be based on a number of factors including: the number of pages for histories are maintained, the number of page instances maintained in a page history, the type and/or amount of information maintained (e.g., the fee may be higher to maintain copies of the canonical DOM representations), and/or the like.

By maintaining multiple instances of a page, the facility enables the user to identify changes between releases of the page and/or to determine whether a modification made by the user to the source code of a page resolved a discrepancy previously identified for different browsers.

In some embodiments, the facility may suggest one or more code fixes that may be used to resolve an identified discrepancy. For example, the facility may maintain a list of known, potential bug fixes for various discrepancies. In some embodiments, the facility suggests fixing problems with "floated" elements in Internet Explorer by specifying the css rule "zoom: 1" to one or more elements. In some embodiments, the facility suggests fixing problems related to overflowing elements by specifying the css rule "overflow: hidden." In some embodiments, the facility suggests that scripting errors may be corrected with syntax suggestions such as semicolon insertion, or recommendations may be provided based on the list of known issues such as two libraries being incompatible. In some embodiments, the facility may automatically modify the source code or DOM of a tested page to determine whether a known bug fix actually resolves an identified discrepancy. The facility may apply and test any number of known, potential bug fixes. If an applied bug fix resolves an identified discrepancy, the facility may report the applied bug fix to the user. The facility may report applied bug fixes that did not resolve an identified discrepancy. By attempting to automatically resolve identified discrepancies, the facility may significantly reduce the time required by a user to debug a page. For example, if a reported bug fix resolves an identified discrepancy, the developer may implement the bug fix without debugging the page. In some embodiments, the facility provides an interface that enables the developer to automatically implement bug fixes suggested by the facility. For example, the interface may be presented to the user as an "accept" control that, when selected by the user, modifies the source code of the page in accordance with the suggested bug fix. In some embodiments, if no successful bug fixes are reported, the developer can review the bug fixes attempted by the facility (if any), so that the developer does not waste time implementing the same or similar modifications shown to be unsuccessful.

In some embodiments, the list of known, potential bug fixes is modifiable (e.g., bug fixes may be modified, bug fixes may be added and/or removed from the list, etc.). For example, a bug fix may be extended to include a version-specific bug fix for a newly released browser. As another example, the facility may observe a code change made by a user that resolves an identified discrepancy. If the same or a similar discrepancy is later identified, the facility may modify the source code of the tested page based on the observed bug fix, and may further report whether the observed bug fix resolved the identified discrepancy. In some embodiments, if an observed bug fix successfully resolves an identified discrepancy, it is added to the list of known, potential bug fixes. In some embodiments, the list modifiable by an operator of the facility and/or users of the facility. Modifications made by a user may be associated with the user's account and/or adopted by the facility for other users.

In some embodiments, the facility charges users a fee to interact with the facility. The facility may charge on a periodic basis (e.g., weekly, monthly, etc.), a usage basis (e.g., per-page, per-domain, etc.), and/or other fee structures. For example, a developer may be charged a fixed monthly subscription fee for unlimited usage of the facility. In some embodiments, the fee varies based on the types of discrepancies to be identified (e.g., layout discrepancies, presentation discrepancies, scripting error discrepancies, functional test discrepancies, etc.). For example, the facility may charge a developer on a per-page basis for each functional test, yet charge a fixed fee to identify layout and/or presentation discrepancies. In some embodiments, the facility charges a separate code correction fee for suggested bug fixes. The facility may only charge the code correction fee if a suggested bug fix is implemented (e.g., as observed by the facility in a subsequent test). In some embodiments, the facility charges based on the number of discrepancies identified. For example, the facility may charge a rate of 10 cents per discrepancy. The rate per discrepancy may be reduced for previously identified discrepancies that are identified again in a subsequent test. In some embodiments, a limited number of the identified discrepancies are provided to the user for free and the facility charges the user to view the remaining discrepancies, if requested. For example, if ten discrepancies are identified, the facility may report one discrepancy for free and charge the user to view the remaining nine discrepancies. In some embodiments, the facility implements a "freemium" model to charge users. For example, under a freemium model, the facility may identify certain discrepancies for free, while charging a premium to identify other types of discrepancies. As another example, under a freemium model, the facility may enable a user to test a specified number of pages for free, and then charge a premium for pages exceeding the specified number and/or exceeding a specified time period. As yet another example, under a freemium model, the facility may offering certain services for free (e.g., generating augmented screenshots highlighting the visual discrepancies in a page rendered by different browsers), while charging a premium for other services (e.g., triaging identified discrepancies, maintaining page histories, automated code correction, and/or other services).

While various embodiments are described in terms of the environment described above, those skilled in the art will appreciate that the facility may be implemented in a variety of other environments including a single, monolithic computer system, as well as various other combinations of computer systems or similar devices connected in various ways. For example, in some embodiments, the web server 110 and the controller 125 are implemented in a single computer, even though it is not illustrated as such in FIG. 1. As another example, in some embodiments, one or more of the browsers 135 are executed at the controller 125, even though it is not illustrated as such in FIG. 1. As yet another example, two or more browsers 135 may be executed on a single computer executing multiple concurrent operating systems or operating system versions, emulating different hardware configurations, and so on. It is further noted that the number of client computers, web servers, databases, controllers, and/or browsers is not limited to the number of computers or ratio of computers illustrated in FIG. 1. The facility is designed to scale to include thousands or millions of computers. Moreover, those skilled in the art will appreciate that the facility may include other types of computers and/or devices not specifically illustrated.

FIGS. 2A-2D are flow charts of processes performed by the facility to generate a report identifying visual discrepancies and/or functional discrepancies between rendered versions of a page produced by different browsers. In some embodiments, one or more of processes 200a-200d or steps of the processes are performed by a controller 115. In step 201, the facility receives a set of pages. For example, the received set may comprise one or more URLs identifying pages to be tested by the facility. To facilitate description, it is assumed that the received set includes a URL or pointer to a HTML document having the source code illustrated in FIG. 3. It is noted that the facility may be used to identify visual and/or functional discrepancies in source code that is considerably more complex than the source code illustrated in FIG. 3. As such, the HTML document illustrated in FIG. 3 should not be taken as restrictive. In some embodiments, the facility crawls the received set to identify links included on the pages. The identified links may be added to the received set or stored for further processing. In some embodiments, the facility compiles a list of identified links for each page is the received set and removes any duplicate links and/or those that point to pages included in the received set.

In some embodiments, the received set includes control information used to test the identified pages. In some embodiments, all or a portion of the control information is received separately from the set of pages and/or is retrieved from storage (e.g., from the service cloud 120, the database 115, and/or another storage device). In some embodiments, the control information specifies the browsers to be tested (e.g., Firefox 3, IE7, etc.). The number of browsers tested may vary on a per set or per page basis. However, to facilitate description, it is assumed that the control information associated with the set of pages received in step 201 specifies that the HTML document illustrated in FIG. 3 is to be tested on Firefox 3 on a MAC and Internet Explorer 7 on a PC. In some embodiments, the control information identifies a browser that is to be used as a baseline or reference browser. When a browser is selected as a baseline browser, its output is used as a basis for comparison against the output of the other tested browsers. To facilitate description, it is assumed that the control information specifies that Firefox 3 is to be selected as the baseline browser.

The facility loops through each page that is included in the received set in steps 203-259. In step 203, the facility selects a page from the received set. The facility loops through each browser to be tested for the selected page in steps 205-219. In step 205, the facility selects a browser on which the selected page is to be tested. In step 207, the facility processes the selected page for the selected browser.

Figure 2A:
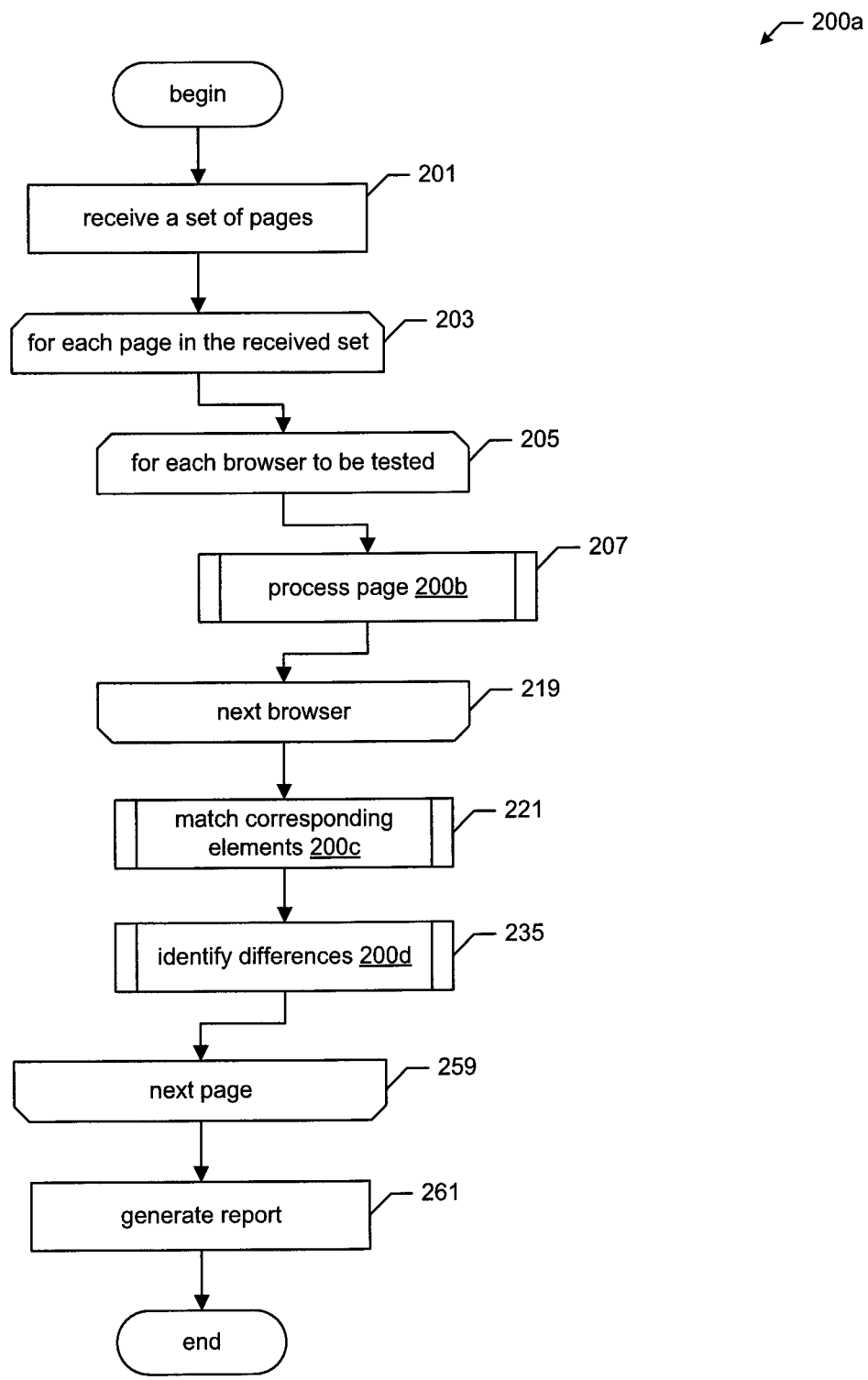
FIGS. 2A-2D are flow charts of processes performed by the facility to generate a report identifying visual discrepancies and/or functional discrepancies between rendered versions of a page produced by different browsers.
Figure 2B:
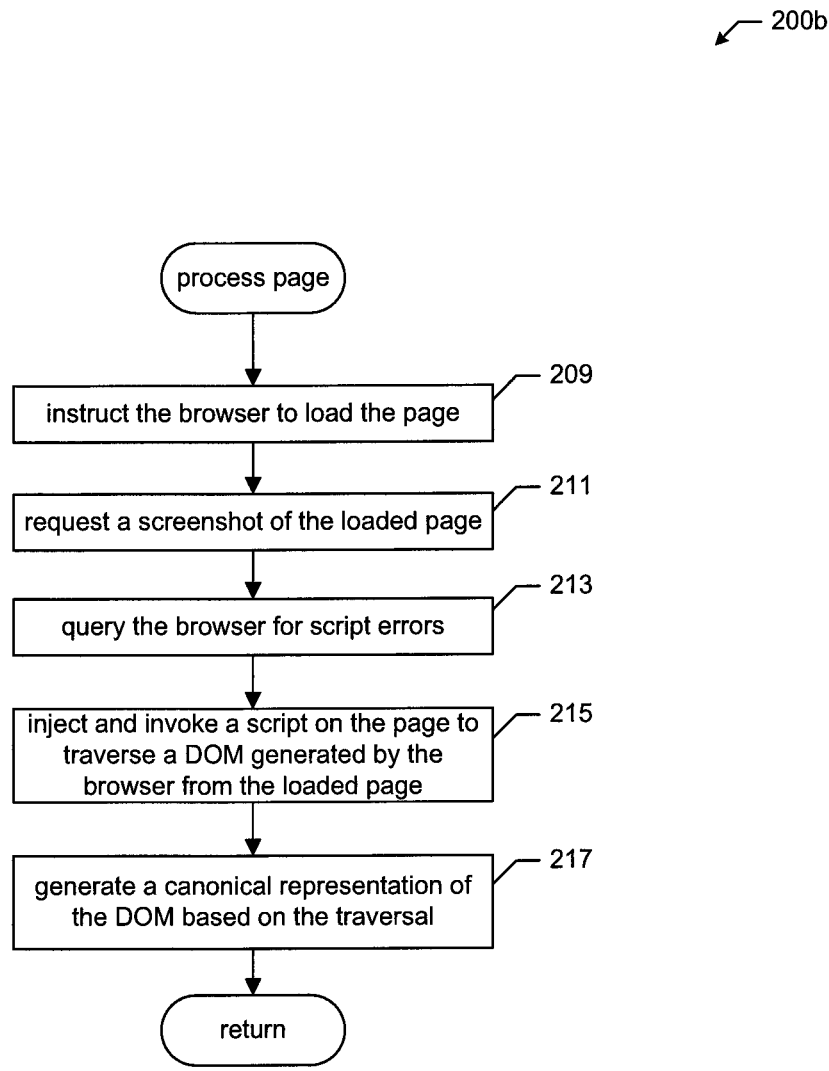

FIG. 2B illustrates a process 200b that may be performed by the facility to process a selected page for a selected browser. In step 209, the facility instructs the selected browser to load the selected page. In some embodiments, the selected page is located on a third-party web server that requires authentication/authorization to access the selected page. For example, the third-party web server may redirect the selected browser to a login page in response to receiving a request to load the selected page. As another example, to access the selected page, a separate implementation of the facility may be implemented behind a firewall of a web server to examine pages that are not otherwise made accessible through known security protocols/authentication techniques. That is, a software product implementing aspects of the facility may be purchased by developers or website operators that do not wish to make their development pages available over the Internet. Testing facilities implemented behind a firewall may provide additional security benefits. Such testing facilities may include all or a subset of the features described herein.

The facility may store page metadata acquired from the browser, such as the title of the loaded page or page dimensions, in the database 115.

Figure 4:
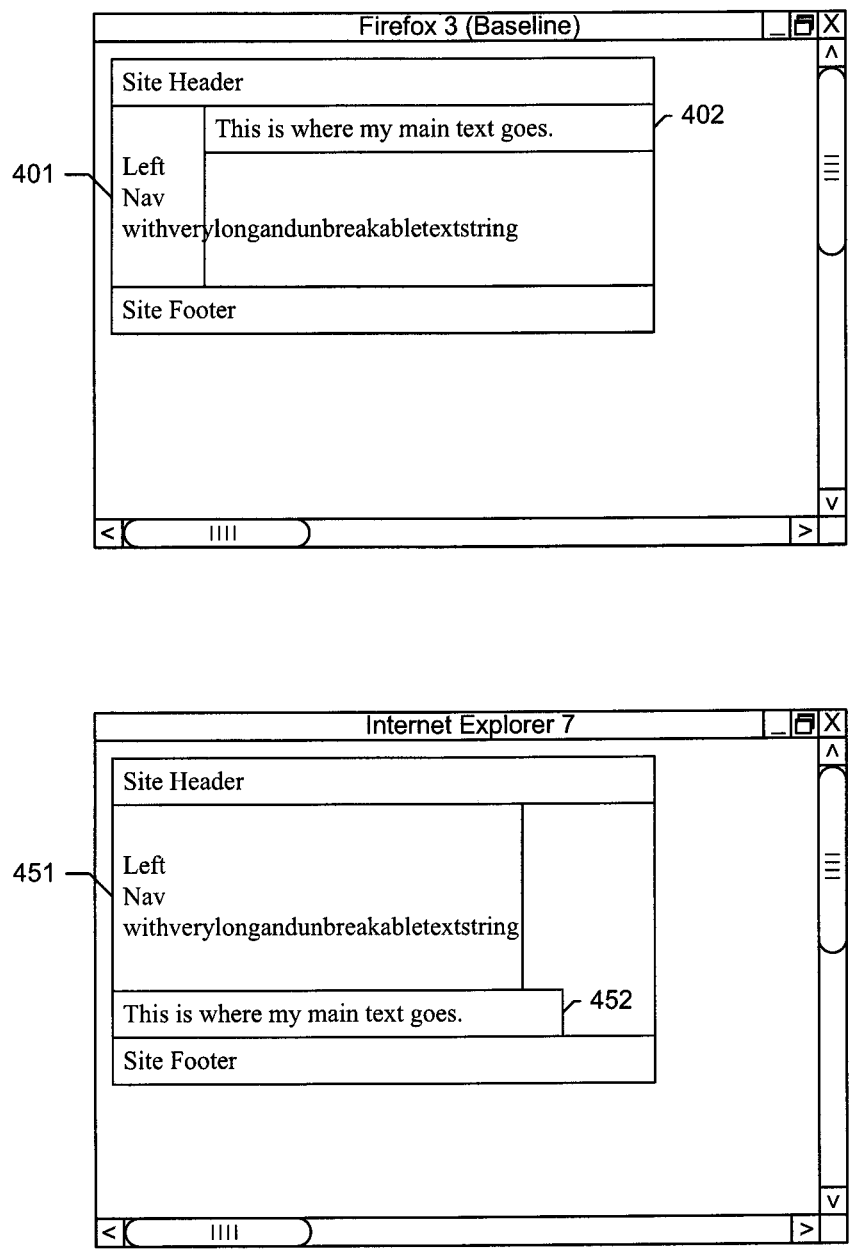
FIG. 4 shows two screenshots of the HTML document illustrated in FIG. 3 as rendered by two different browsers.

In step 211, the facility requests a screenshot of the loaded page in the selected browser. For example, in some embodiments, the controller 125 sends a message 130 to the selected browser to capture and return a screenshot of the loaded page. The controller 125 may communicate directly with the selected browser via a browser API and/or with a browser driver that enables the controller 125 to indirectly communicate with the selected browser. The selected page may be loaded in a common resolution (e.g., 1024×768) or, after the selected page is loaded, the facility may instruct the selected browser to adjust the resolution and/or to resize the loaded page to enclose the page contents prior to capturing a screenshot of the rendered page. FIG. 4 shows two screenshots of the HTML document illustrated in FIG. 3 as rendered by Firefox 3 and Internet Explorer 7. In the illustrated embodiment, the source code gives rise to at least one visual discrepancy when rendered by the tested browsers. For example, the div elements having identifiers of "nav" (FIG. 3, line 0026) and "content" (FIG. 3, line 0027) are rendered by Firefox 3 with top edge collinearity and without left edge collinearity (FIG. 4, elements 401 and 402), while the same elements are rendered by Internet Explorer 7 with left edge collinearity and without top edge collinearity (FIG. 4, elements 451 and 452). Screenshots captured in step 211 may be stored for further processing, such as augmenting those screenshots which correspond to a page that produces visual discrepancies in different browsers.

In step 213, the facility queries the browser for scripting errors (e.g., reported to the browser console) and/or performs functional tests on the loaded page. If any script errors are reported, the facility stores the script errors for further processing. Similarly, the results of any functional tests performed on the loaded page may be stored for further processing.

In step 215, the facility injects and invokes a script to traverse the Document Object Model (DOM) generated by the selected browser from the loaded page (e.g., the rendered HTML, applied Cascading Style Sheets (CSS), JavaScript, dynamic HTML (DHTML), and/or the like). The DOM is a cross-platform and language-independent convention for representing and interacting with objects in HTML, XHTML documents, and the like. The invoked script traverses the DOM of the selected browser by calling various Application Programming Interfaces (APIs) provided by the W3C DOM specification (e.g., getNextSiblingElement, childNodes, offsetLeft, width, etc.). Those skilled in the art will appreciate that details regarding DOM specifications are known and well documented, and thus need not be described in detail in order to gain an understanding of the operation of the facility. Those skilled in the art will further appreciate that other and/or additional techniques to may be implemented by the facility to determine position information or query properties of DOM elements of the loaded page in the selected browser. For example, one or more the browsers on which the page is loaded may provide a direct interface to the DOM, such that the facility need not inject or invoke a script to traverse the DOM of the selected browser.

In step 217, the facility generates a canonical representation of the DOM for the selected browser based on the traversal of the DOM generated by the selected browser from the loaded page. In some embodiments, the canonical representation includes positioning information and applied styles of the root element, parent elements, sibling elements, children elements, and/or the like. The canonical representation of the DOM can be generated by enumerating the elements in the document using DOM APIs invoked from JavaScript methods. The canonical representation is generated after the page has applied all styles and manipulations of elements on the page. In some embodiments, the canonical representation is an XHML document string, intended to simulate the static document required to display the live page without external application of styling and scripting. For example, a page may initially display five elements in a particular position, but after styles have been applied and page script has executed, the resulting page may display four elements in different positions and with different dimensions. The canonical DOM representation would include only the four elements with their new positions and dimensions. For example, FIGS. 5A and 5B illustrate canonical representations of the DOMs produced by the Firefox 3 and Internet Explorer 7 browsers from a loaded page having the source code illustrated in FIG. 3. FIG. 5A illustrates a canonical representation of the DOM produced by Firefox 3, while FIG. 5B illustrates a canonical representation of the DOM produced by Internet Explorer 7.

In some embodiments, such canonical representations are generated by the facility. However, it is noted that the canonical representations may be generated in a separate computer system, operated and/or controlled by the same entity or a different entity as the facility, to which DOMs of loaded pages are provided as input. Canonical representations generated in step 217 may be stored for further processing, such as to identify various presentation and/or layout discrepancies produced by different browsers. In some embodiments, non-display elements and certain display elements may be removed from the canonical representations. For example, the facility may remove elements having position information when no visual representation is present (e.g. script elements) or those typically misreported by the DOM of a browser (e.g., Internet Explorer is known to misreport position information of certain elements, such as area elements). If elements are removed from a canonical representation, the corresponding elements in other canonical representations of the same page loaded in different browsers may also be removed and/or disregarded to maintain consistency between the canonical representations of the same page.

Canonical representations of the DOMs may be stored by the facility in a variety of forms including, for example, one or more tables, XML files, specialized data structures, and/or the like. The canonical representations illustrated in FIGS. 5A and 5B are shown as XML files whose contents and organization are designed to make them more comprehensible by a human reader. Those skilled in the art will appreciate that canonical representations may differ from the XML files shown. For example, they may be organized in a different manner; may contain more or less information than shown; may be compressed and/or encrypted; and so on.

Returning to FIG. 2A, in step 219, if the selected page is to be tested on another browser, then the facility continues to step 205 to select the next browser, else the facility continues to step 221. In some embodiments, the facility performs the page processing operations 207 in parallel on each tested browser. In step 221, the facility matches corresponding elements included in each canonical representation of the selected page.

Figure 2C:
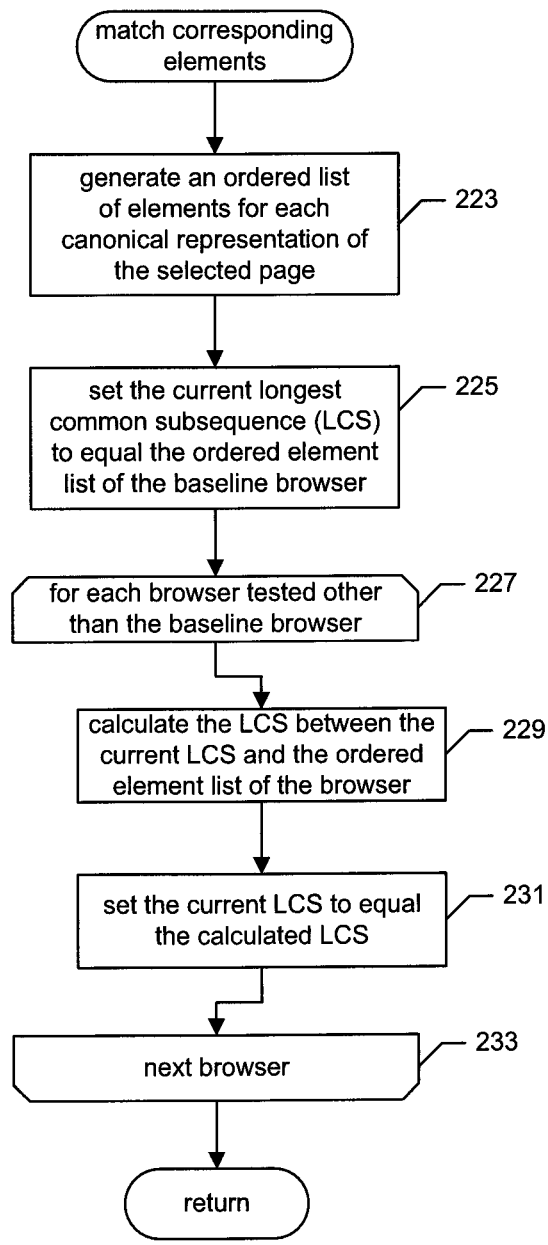

FIG. 2C illustrates an example process 200c that may be performed by the facility to match corresponding elements. In some embodiments, the facility matches corresponding elements by performing a pairwise comparison of the elements in the canonical representations of the DOMs for the page generated by different browsers according to a specified traversal order. The traversal order may be prefix order, a postfix order, or the like. In the embodiment illustrated in FIG. 2C, the facility matches corresponding elements by generating the longest common subsequence of elements of the selected page. The facility may match corresponding elements based on element tags, ids, classes, attributes, contents, and so on. In step 223, the facility generates an ordered list of elements for each canonical representation of the selected page. The list of elements may be ordered according to their DOM identifiers and/or the traversal order. In step 225, the facility sets the current longest common subsequence (LCS) equal to the ordered list of elements identified in the canonical representation of the DOM generated by the baseline browser from the selected page. The facility loops through each tested browser other than the baseline browser in steps 227-233. In step 227, the facility selects a tested browser. In step 229, the facility calculates the LCS between the current LCS and the ordered list of elements identified in the canonical representation of the DOM generated by the selected browser from the selected page. In step 231, the facility sets the current LCS to equal the calculated LCS (step 229). In step 233, if the LCS has not been calculated between the current LCS and the ordered list of elements of another browser, then the facility continues to step 227 to select the next browser, else the process 200c ends. In some embodiments, when the process 200c ends the current LCS is returned and/or stored for further processing. For example, the facility may remove non-display elements and certain display elements from the LCS. As another example, in some embodiments, the facility identifies visual discrepancies for each matched element in the LCS. FIG. 6 illustrates the LCS calculated between elements from the canonical representations illustrated in FIGS. 5A and 5B.

It is noted that significant differences between browser renderings may exist; for example, when a page displays an "unsupported browser" message in lieu of the page contents. Thus, in some embodiments, the facility may also calculate matching element lists between the baseline browser and each other browser. For example, in FIG. 2C, the facility could calculate an LCS between each selected browser and the baseline browser. The facility may exclude browser renderings from comparison which fail to meet a certain threshold of matched elements and/or flag the page as non-matching. Further, operations performed on matched elements by the facility may be applied to the matched element list common to all browsers, the matched list for the selected browser, or a matched list excluding one or more browsers.

Returning to FIG. 2A, in step 235, the facility identifies visual discrepancies (e.g., presentation, layout, etc.) and/or functional discrepancies in the selected page produced by different tested browsers.

Figure 2D:
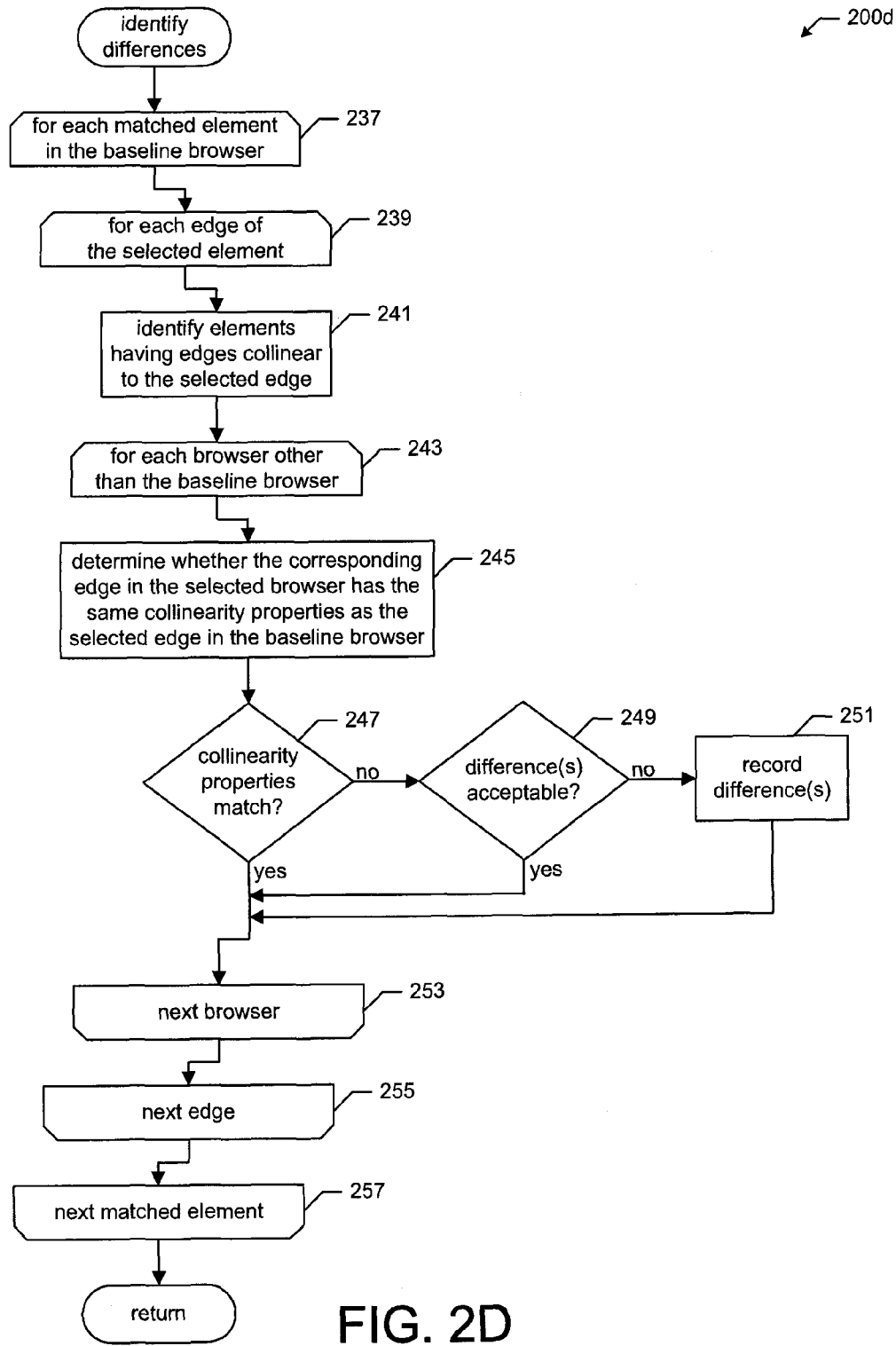

FIG. 2D illustrates an example process 200*d* that may be performed by the facility to identify visual discrepancies in a selected page. For example, the process 200*d* may be performed by the facility to identify discrepancies in the collinearity properties of display elements of the selected page. Elements are laid out on a page according to the CSS defined "Box model." Each element is represented as a rectangle, with 4 edges. In some embodiments, there are two types of collinearity: horizontal (applied to the top and bottom edges) and vertical (applied to the left and right edges). Two elements' corresponding horizontal edges are considered collinear if it is possible to draw a horizontal line through both edges. Similarly, vertical edges are considered collinear if it is possible to draw a vertical line through both edges. Edges may also be considered collinear if one edge can be shifted by a pixel or percentage based threshold to become collinear. As an example, a top horizontal edge 10 pixels from the top of the page may be considered collinear to another element whose top horizontal edge is 12 pixels from the top. In some embodiments, the edges used may be the margin edge, the border edge, padding edge, the content edge, or a combination of these edges defined by the box model. In steps 237-257, the facility loops through each matched display element in the canonical representation of the DOM generated by the baseline browser from the selected page (e.g., identified in step 221 of FIG. 2A). In step 237, the facility selects a matched display element. The facility loops through each edge of the selected element in steps 239-255. In some embodiments, the facility processes a subset of the selected element edges. For example, in some embodiments, the facility only selects the top and left edges of a matched element. In step 239, the facility selects an edge of the selected element. In step 241, the facility identifies elements in the canonical representation of the DOM generated by the baseline browser having edges collinear to the selected edge. In steps 243-253, the facility loops through each browser other than the baseline browser to determine whether, for each selected browser, the corresponding edge of the corresponding element in the canonical representation of the DOM generated by the selected browser has the same (or acceptable) collinearity properties as the selected edge. In some embodiments, the facility generates a diagram of the edge collinearities for each matched element. FIG. 7 illustrates an example collinearity diagram produced by examining the collinearity properties of the matched display elements in the canonical representations of the DOMs illustrated in FIGS. 5A and 5B.

In step 243, the facility selects a browser. In step 245, the facility determines whether the corresponding edge of the corresponding element in the canonical representation of the DOM generated by the selected browser has the same collinearity properties as the selected edge of the selected element in the canonical representation of the DOM generated by the baseline browser. For example, as illustrated in FIG. 7, the collinearity properties of the top edge of element 3 are the same in the selected browser (i.e., Internet Explorer 7) and the baseline browser (i.e., Firefox 3). As another example, the collinearity properties of the top edge of element 4 are not the same in the selected browser and the baseline browser. That is, in the embodiment illustrated in FIG. 7, the top edge of element 4 is collinear with the top edge of element 5 in the baseline browser (i.e., Firefox 3), while the top edge of element 4 is not collinear with the top edge of element 5 in the selected browser (i.e., Internet Explorer 7).

Figure 8:
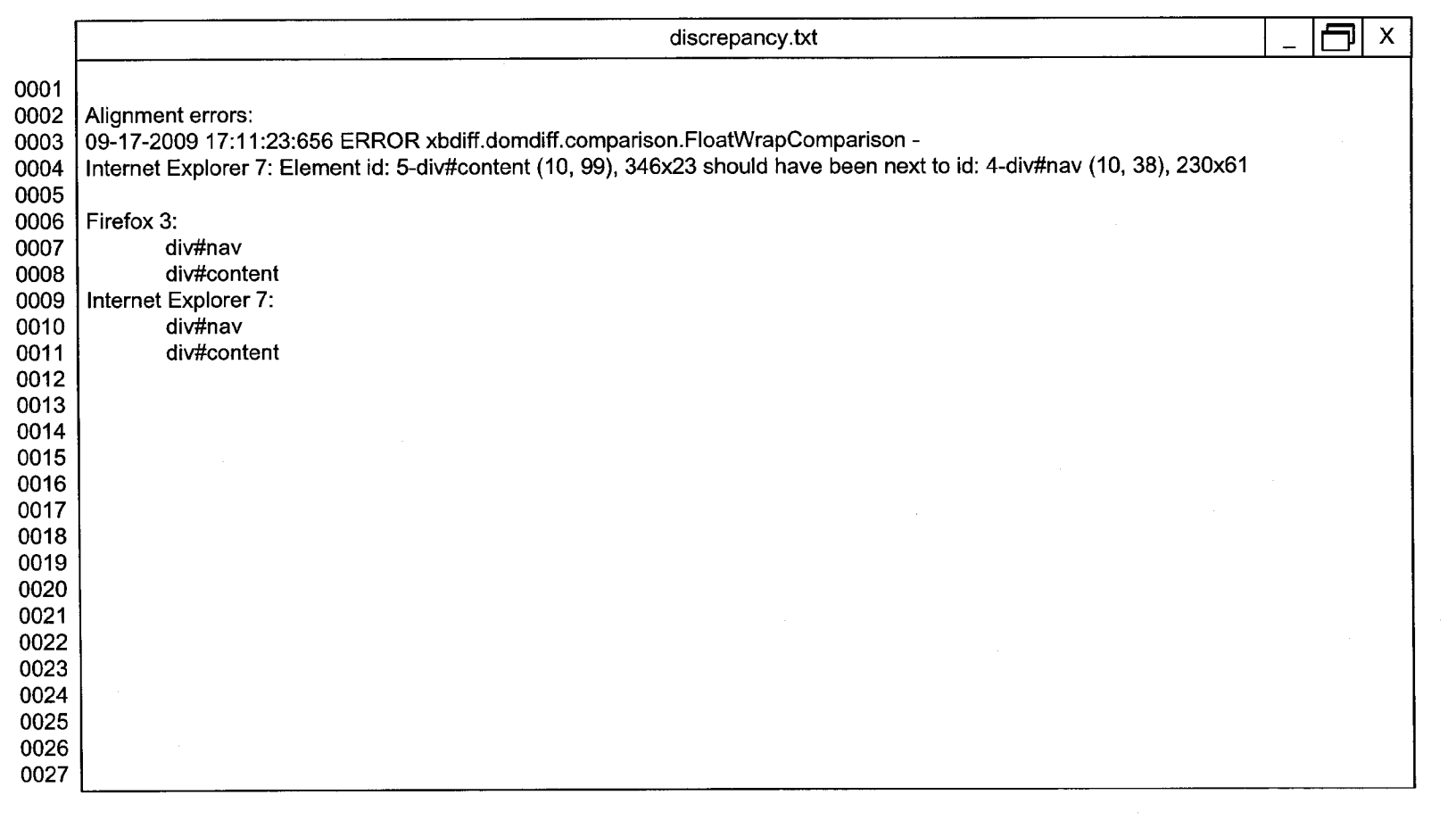

Returning to FIG. 2D, in step 247, if the collinearity properties of the corresponding edges are not the same, then the facility continues to step 249, else the facility continues to step 253. In step 249, if the identified difference between the collinearity properties is acceptable, then the facility continues to step 253, else the facility continues to step 251. In step 251, the facility records the identified difference. In some embodiments, the facility records information describing the difference in a discrepancy data structure associated with the selected page. The facility may record one or more descriptions of an identified difference. FIG. 8 illustrates an example discrepancy data structure listing at least one unacceptable collinearity difference identified in FIG. 7. In the embodiment illustrated in FIG. 8, lines 2-3 of the data structure include a textual description of a collinearity difference. In some embodiments, the textual description of collinearity differences and/or other identified discrepancies are provided to the user by the facility. For example, in some embodiments, the facility enables a user to access discrepancy data structures associated with a selected page.

Returning the FIG. 2D, in step 253, if the collinearity properties of the selected edge have not been compared to the collinearity properties of the corresponding edge in another browser, then the facility loops back to step 243 to select the next browser, else the facility continues to step 255. In step 255, if the collinearity properties of an edge of the selected element in the baseline browser have not been compared to the collinearity properties of the corresponding edges in the tested browsers, then the facility loops back to step 239 to select the next edge of the selected element, else the facility continues to step 257. In step 257, if any matched display elements have not been processed for the selected page, then the facility loops back to step 237 to select the next matched display element, else the process 200*d* ends. In some embodiments, when the process 200*d* ends the recorded discrepancy data structures are returned and/or stored for further processing. For example, in some embodiments, a discrepancy data structure is used by the facility to generate a report identifying discrepancies in the selected page.

Returning the FIG. 2A, in step 259, if a page in the received set of pages has not be selected for processing, then the facility loops back to step 203 to select the next page from the received set, else the facility continues to step 261. In step 261, the facility generates a report of the visual and/or functional discrepancies identified for the received set. Then the process 200*a* ends.

The facility may generate a report for each page in the received set and/or a report for the set of pages. In some embodiments, one or more portions of a discrepancy data structure are used by the facility to generate a report identifying discrepancies in a page. For example, a generated report may include a textual description of a collinearity difference (e.g., based one or more of lines 2-3 of the discrepancy data structure illustrated in FIG. 8). As another example, a generated report may include one or more augmented screenshots. The screenshots may be augmented in accordance with the collinearity difference information from a discrepancy data structure. In the embodiment illustrated in FIG. 8, lines 7-8 and 10-11 identify a set of elements (i.e., elements 4 and 5 in FIG. 7) whose collinearity properties differ when the selected page is loaded by the tested browsers identified in lines 6 and 9 (i.e., Firefox 3 and Internet Explorer 7). In some embodiments, the facility highlights the identified elements in screenshots of the page rendered by the identified browsers. The elements may be highlighted according to the position information of the element in the canonical representation of the DOM generated by the corresponding browser from the loaded page. FIG. 9 is an example of augmented screenshots highlighting the collinearity difference listed in the discrepancy data structure illustrated in FIG. 8. In the illustrated embodiment, the facility has augmented the screenshots of the selected page by filling each of the elements with a unique fill pattern. However, it is noted that the facility may highlight visual discrepancies in a variety of ways (e.g., color, line weight, fill, shape, and/or the like). Typically, the facility highlights matched elements in a consistent manner. For example, in the embodiment illustrated in FIG. 9, element 4 has been augmented in each of the screenshots with a horizontal line fill pattern, while element 5 has been augmented in each of the screenshots with a vertical line fill pattern. By consistently highlighting each matched element whose presentation and/or layout properties differ between the tested browsers, a user viewing the augmented screenshots is able to quickly and efficiently spot the visual discrepancies in the page produced by each tested browser, thereby reducing the time spent by the user to determine whether a page has an acceptable presentation and/or layout across multiple tested browsers.

Those skilled in the art will appreciate that the steps shown in FIGS. 2A-2D may be altered in a variety of ways. For example, the order of certain steps may be rearranged; certain sub-steps may be performed in parallel; certain shown steps may be omitted; or other steps may be included; and so on.

It is noted that the facility may identify differences between the tested browsers using other, or additional, methods than the method illustrated in FIG. 2D. For example, in some embodiments, the facility compares the size of each element and/or compares the horizontal and/or vertical offsets between elements to identify inconsistencies in the rendered versions of a web page produced by different browsers. As one example, the controller may compare the distance between sibling elements in each rendered version of the web page. Distances differing by more than a specified threshold may be identified as a discrepancy. In some embodiments, the threshold is an absolute distance. For example a threshold of 1 pixel would require an exact match of the pixel distance between the sibling elements rendered by each browser, while a threshold of 20 pixels would allow the pixel distance between sibling elements rendered by each browser to differ in distance by as many as 20 pixels. In some embodiments, a percentage-based threshold is used based on element dimensions. For example, a threshold of 20% may be used to identify elements that are positioned more than 20% of their height and/or width farther, or closer, to a sibling element.

Although the above-listed distance comparison examples have been described as a comparison of the distance between sibling elements in rendered versions of a web page produced by different browsers, those skilled in the art will appreciate that similar distance comparisons may be performed between sets of elements and/or elements having different relationships (e.g., comparing the distances between parent and child elements, between elements to the body or root element, etc.). As such, the description of a sibling-based distance comparison should not be taken as restrictive.

As another example, in some embodiments, the facility compares the angle between the anchor points of two elements. An anchor point of an element may be the top/left point of an element, the bottom/right point of an element, the center point of an element, and so on. In this example, given two elements, element A and element B, the angle between the two elements may be calculated by drawing a line between their corresponding anchor points and measuring the line's angle from the x-axis. For example, two elements of the same size stacked vertically, with element B above element A, would form a 90 degree angle. In another browser, element B may be slightly up and to the right of element A, with the line joining their centers forming a 30 degree angle. The resulting angle difference would be 90−30=60 degrees. In some embodiments, if the angle difference exceeds a specified angle-based threshold, the facility determines that the elements are displayed differently by the tested browsers. As another example, the facility may compare the slopes of lines between the corresponding anchor points.

As yet another example, in some embodiments, differences between browser presentations are detected by examining the consistency of applied styles between the tested browsers. The Cascading Style Sheet (CSS) specifications describe how styling rules should be applied to elements. By comparing the applied styles of each element, presentation differences can be detected by the facility. For instance, the float property indicates a box that should be shifted to the left or right side of the current line, or shifted downward until it fits. In the baseline browser, three floats may appear on a single line, while in another browser, only two of the three floats appear on a single line. This may be recorded as a presentation discrepancy. It is noted that not all presentation discrepancies result in visual differences in the tested browsers.

Figure 10:
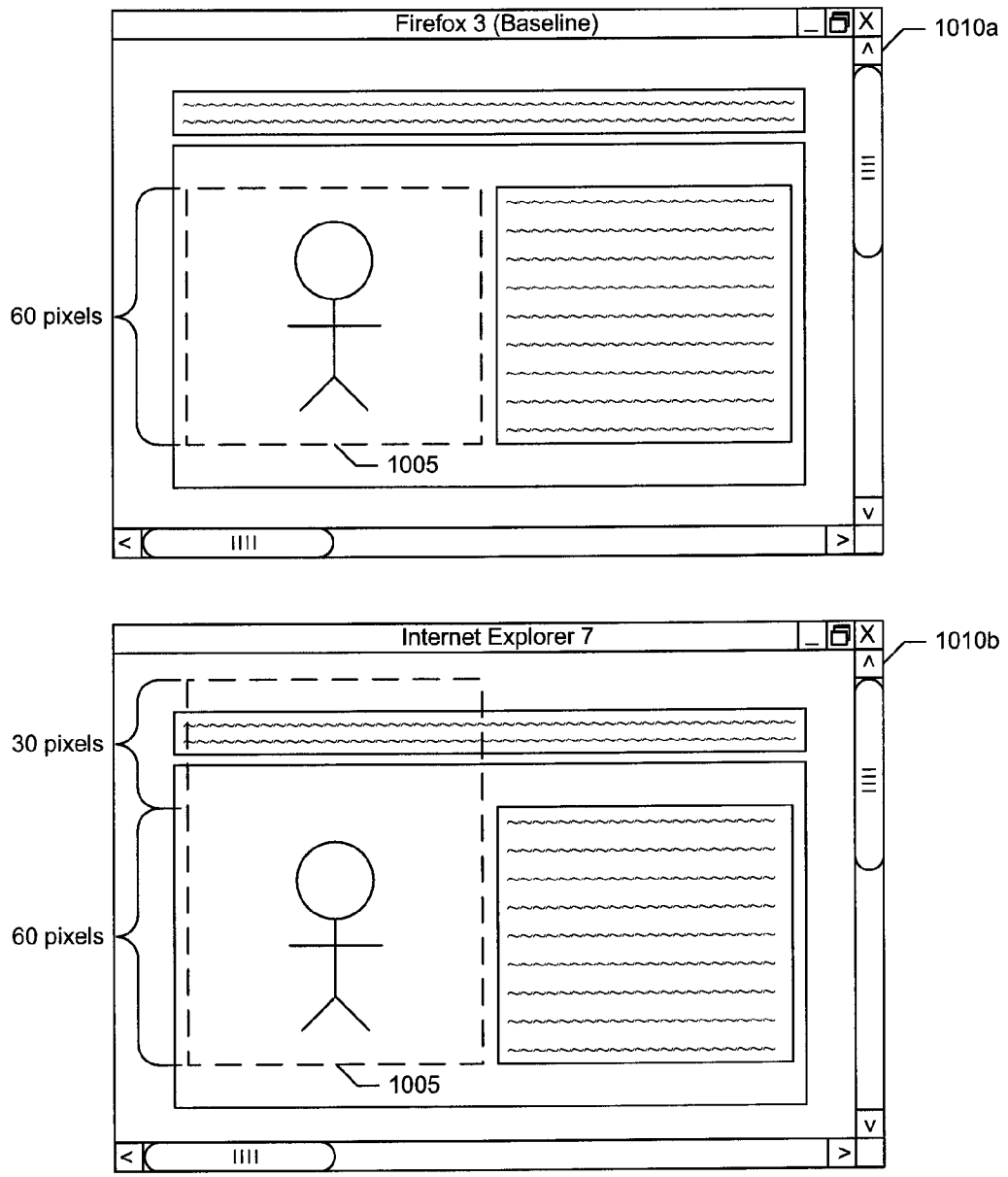
FIG. 10 is an example of screenshots highlighting a visually consistent element that may be initially identified as a presentation discrepancy.

In some embodiments, the facility determines whether a presentation discrepancy results in visual difference by examining resulting presentation symptoms. For example, elements on a page are placed according to the CSS specification's "Box Model." In many cases, the content size is not explicitly defined and is dependent on the browser's rendering of that content. The rendered content may contain additional content boxes. Presentation discrepancies can be detected by examining differences in rendered content sizes between browsers. For example, a baseline browser may render content within a box having a size of 70 pixels wide by 60 pixels high, while another tested browser may render the same content within a box having a size of 70 pixels wide by 90 pixels high. In some embodiments, the facility infers that the size or positioning of elements within that box differ from the other browser, and the difference information is recorded as a potential presentation discrepancy. However, because browsers may misreport the position or size of an element, the facility may verify certain types of presentation discrepancies. For example, the facility may determine that an identified presentation discrepancy is not actually visually inconsistent between browsers. FIG. 10 is an example of screenshots highlighting a visually consistent element that may be initially identified as a presentation discrepancy in some embodiments. In the illustrated example, the dashed border around element 1005 is used to represent the reported size of the element in each browser 1010, and is not actually rendered. In some embodiments, the facility disregards misreported discrepancies, such as the example illustrated in FIG. 10. For example, the facility may use image comparison techniques detect the misreported size or position of an element. In the illustrated embodiment, the baseline browser 1010*a* reports that element 1005 is 60 pixels tall, while another browser 1010*b* reports that element 1005 90 pixels tall. By comparing the areas of the screenshot where the element 1005 is placed in each browser, it is possible to determine whether the presentation discrepancy actually produces a visual inconsistency. In some embodiments, the controller uses corrected position and/or size information to determine whether a rendered element is visually consistent between browsers. In the illustrated embodiment, element 1005 rendered by browser 1010b is actually only 60 pixels tall but within a 90 pixel boundary, and thus produces no visual inconsistency between the tested browsers. Using the corrected information, the controller may disregard misreported differences unless the rendered element remains visually inconsistent between browsers.

Figure 11:
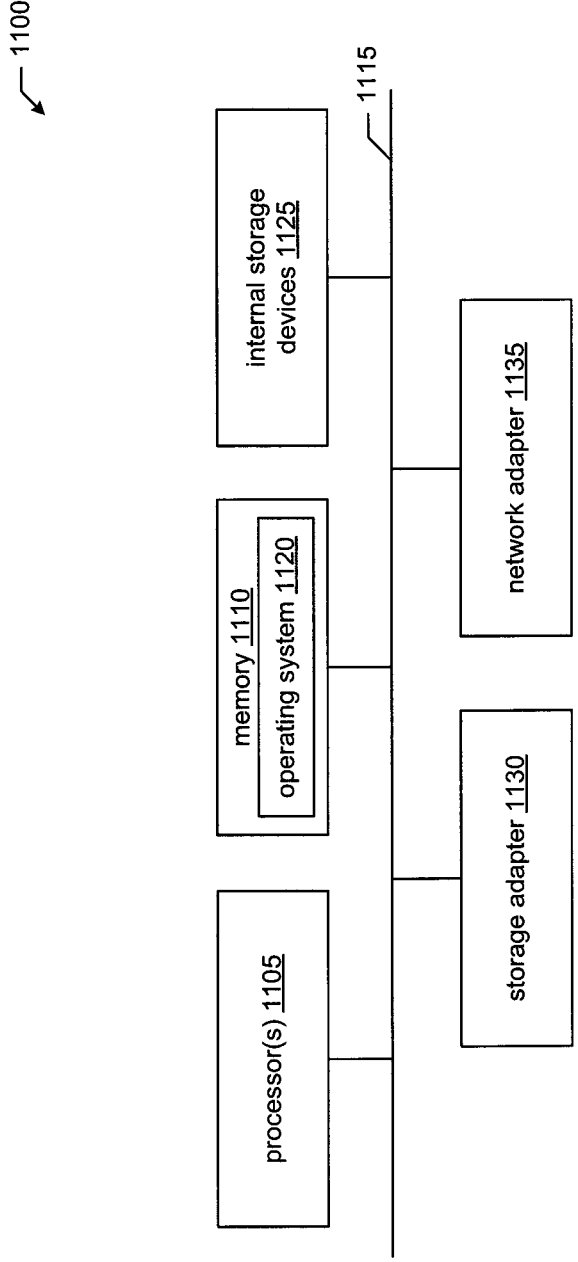
FIG. 11 is a block diagram showing components of a computer used to support the operation of the facility.

FIG. 11 is a block diagram showing components of a computer used to support the operation of the facility in one or more embodiments. It is noted that well-known structures and functions have not been shown or described in detail to avoid obscuring the description. The computer 1100 includes one or more processors 1105 and memory 1110 coupled to an interconnect system 1115. The interconnect system 1115 shown in FIG. 11 is an abstraction that represents any one or more separate physical buses and/or point-to-point connections, connected by appropriate bridges, adapters and/or controllers. The interconnect system 1115 may include, for example, a system bus, a form of Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 1105 are the central processing units ("CPUs") of the computer 1100 and, thus, control its overall operation. In some embodiments, the processors 1105 accomplish this by executing software stored in memory 1110. In some embodiments, the computer includes a processor 1105 having two or more independent cores in a package composed of a single integrated circuit (referred to as a "die"), one or more dies packaged together, multiple packages, and so on. In some embodiments, the computer includes a hyper-threaded processor that, despite having only a single core, is capable of performing as a multi-core processor. A processor 1105 may be, or may include, one or more programmable general-purpose or special-purpose microprocessors, digital signal processors ("DSPs") programmable controllers, application specific integrated circuits ("ASICs"), programmable logic devices ("PLDs"), or the like, or a combination of such devices.

Memory 1110 includes the main memory of the computer 1100. Memory 1110 includes any form of volatile, nonvolatile, removable, and non-removable computer-readable storage media, or any combination of such media devices that are capable of storing information such as computer-readable instructions, data structures, program modules, or other data. Memory 1110 stores (among other things) an operating system 1120. The operating system 1120 may be a Microsoft Windows® operating system, a Linux operating system, a Mac OS, or the like. It is noted that the facility does not depend on the operating system 1120 implemented by the computer 1100.

Also connected to the processors 1105 through the interconnect system 1115 are one or more internal storage devices 1125, a storage adapter 1130 and a network adapter 1135. Internal storage devices 1125 may include volatile (e.g., RAM), nonvolatile (e.g., ROM, Flash, etc.), removable, and non-removable computer-readable storage media, or any combination of such media devices that are capable of storing information such as computer-readable instructions, data structures, program modules, or other data. It is further noted that the term storage medium may refer to a physical a virtualized computer-readable storage medium. The storage adapter 1130 allows the computer to access one or more storage systems and may be, for example, a Fibre Channel adapter, a USB adapter, a SCSI adapter, eSATA adapter, or the like. The network adapter 1135 provides the computer with the ability to communicate with remote devices over a network and may be, for example, an Ethernet adapter, a Fibre Channel adapter, or the like.

While computer systems configured as described above are typically used to support the operation of the facility, those skilled in the art will appreciate that the technology may be implemented using devices of various types and configurations, and having various components. For example, the computer may include one or more input/output (I/O) devices (e.g., keyboard, mouse, microphone, display, printer, etc.) that allow a user to access programs and/or data stored in memory 1110 of the computer, even though it is not illustrated as such in FIG. 11.

Thus, an automated application compatibility testing facility has been described. Although the facility has been described with reference to specific embodiments, it will be recognized that the facility is not limited to the embodiments described, but can be practiced with modification and alteration within the spirit and scope of the appended claims. For example, the facility may be used to identify differences produced by web-based and/or non web-based applications. Applications are often developed to run on multiple platforms or OS versions. These applications can be tested using the facility and methods described herein. Traditional test methods require predefining a set of test inputs, outputs, states, and steps to execute a test. Then, the tests are run on each platform independently. Using traditional test methodologies, a test failure occurs when the application output does not match the predefined output. Using a baseline or a majority comparison method of the facility, a set of possible inputs and steps can be specified or randomly generated, and the facility tests applications across multiple platforms simultaneously while verifying consistency of the output and/or state. These inputs and steps may be applied randomly, or as defined by the user; however, it is not necessary to define the resulting output or state. As a result, in some embodiments, a test failure occurs when the outputs and/or state are inconsistent, or beyond one or more defined thresholds. Similarly, the model of testing performed by the facility can be applied to test different application configurations, application versions, languages, and so on. Accordingly, the specification and drawings are to be regarded in an illustrative sense rather than a restrictive sense.

I claim:

1. A method in a computer system to identify visual discrepancies in a web page as rendered by a plurality of browsers, the method comprising:
   designating one of the plurality browsers as a reference browser;
   for each browser,
      instructing the browser to load the web page;
      traversing a document object model (DOM) generated by the browser from the loaded web page; and
      based on the traversal, constructing an ordered list of elements of the loaded web page;
   for each element in the ordered list of elements constructed from the DOM generated by the reference browser,
      selecting a first element;
      selecting a first edge of the first element;
      determining whether the first edge of the first element is substantially collinear with a first edge of a second element in the ordered list of elements constructed from the DOM generated by the reference browser;

when the first edge of the first element is determined to be substantially collinear with the first edge of the second element, for each browser other than the reference browser, selecting a browser;

identifying a third element in the ordered list of elements constructed from the DOM generated by the selected browser that corresponds to the first element in the ordered list of elements constructed from the DOM generated by the reference browser;

identifying a fourth element in the ordered list of elements constructed from the DOM generated by the selected browser that corresponds to the second element in the ordered list of elements constructed from the DOM generated by the reference browser;

determining whether a corresponding first edge of the third element is substantially collinear with a corresponding first edge of the fourth element;

when the first edge of the third element is determined not to be substantially collinear with the first edge of the fourth element, generating a discrepancy record identifying a difference in collinearity between the first and second elements of the ordered list of elements constructed from the DOM generated by the reference browser and the third and fourth elements of the ordered list of elements constructed from the DOM generated by the selected browser; and based on the comparison, generating a report of the visual discrepancies in the web page as rendered by the reference browser and each other browser, wherein code implementing the method is stored in memory of the computer system for execution by a processor of the computer system.

2. The method of claim 1 wherein each ordered list of elements is normalized to include only the longest intersection of the elements common to all the ordered lists of elements.

3. The method of claim 1 wherein the first edge of the first, second, third, and fourth elements is the top edge.

4. The method of claim 1 wherein the DOM generated by the browser from the loaded web page comprises: rendered Hypertext Markup Language (HTML), applied Cascading Style Sheets (CSS), and ECMAScript.

5. The method of claim 1 further comprising:
for each browser, querying the browser for scripting errors on the loaded web page, wherein the scripting errors are included in the generated report.

6. The method of claim 1 further comprising maintaining a page history of the web page, wherein the page history includes the generated report of visual discrepancies.

7. The method of claim 1 further comprising:
crawling the web page to identify a link to another web page; and
performing the method for the other web page.

8. The method of claim 1 wherein the generated report includes an interface to tag visual discrepancies.

9. The method of claim 8 wherein, if a visual discrepancy is tagged to indicate that the visual discrepancy is not a bug and the method is subsequently performed for the web page, the visual discrepancy is not included in the generated report irrespective of whether the comparison results in the same visual discrepancy.

10. The method of claim 1 wherein the generated report includes at east one suggested bug fix to correct a visual discrepancy.

11. The method of claim 1 further comprising:
if no visual discrepancies are identified in the generated report, comparing the ordered list of elements constructed from the DOM generated by a selected browser from the loaded web page to a predetermined ordered list of elements, wherein the predetermined ordered list of elements is known to produce an expected result; and
if the ordered list of elements is substantially similar to the predetermined ordered list of elements, indicating in the generated report that no visual discrepancies were identified and that the plurality of browsers produced the expected result.

12. A method in a computer system to identify visual discrepancies in a web page as rendered by a plurality of browsers, the method comprising:
designating one of the plurality browsers as a reference browser;
for each browser,
instructing the browser to load the web page;
traversing a document object model (DOM) generated by the browser from the loaded web page; and
based on the traversal, constructing an ordered list of elements of the loaded web page;
for each browser other than the reference browser, comparing the ordered list of elements constructed from the DOM generated by the browser to the ordered list of elements constructed from the DQM generated by the reference browser;
wherein the comparison comprises:
for each browser other than the reference browser,
selecting a browser;
based on a selected traversal order, determining the longest intersection of the elements common to the ordered list of elements constructed from the DOM generated by the selected browser from the loaded web page with the ordered list of elements constructed from the DOM generated by the reference browser from the loaded web page, wherein the element intersection includes at least one pair of elements;
for each pair of elements included in the element intersection, determining whether an edge of a first element in the ordered list of elements constructed from the DOM generated by the reference browser is substantially collinear with an edge of a second element in the ordered list of elements constructed from the DOM generated by the reference browser; and
for each pair of elements determined to have substantially collinear edges when the web page is loaded in the reference browser,
for each browser other than the reference browser,
selecting a corresponding pair elements from the ordered list of elements constructed from the DOM generated by the browser;
determining whether corresponding edges of the corresponding pair of elements are substantially collinear;
identifying a difference in element collinearity when the corresponding edges are not substantially collinear; and
including the identified difference in the generated report of visual discrepancies; and
based on the comparison, generating a report of the visual discrepancies in the web page as rendered by the reference browser and each other browser, wherein the generated report includes an interface to tag visual discrepancies.

13. The method of claim 12 further comprising:
capturing a screenshot of the loaded web page in the reference browser;
for each browser having an identified difference in element collinearity, capturing a screenshot of the loaded web page in the browser; and
including the captured screenshots in the generated report of visual discrepancies.

14. The method of claim 13 further comprising:
for each pair of elements determined for which a difference of collinearity was identified between the reference browser and another browser, augmenting the screenshot of the loaded web page in the reference browser and the screenshot of the loaded web page in the other browser to identify the pair of elements.

15. The method of claim 12 further comprising:
for each identified difference, determining whether the collinearity difference exceeds a threshold, wherein only collinearity differences exceeding the threshold are included in the generated report of the visual discrepancies.

16. The method of claim 12 further comprising:
maintaining a page history of the web page, wherein the page history includes:
the ordered list of elements constructed from the DOM generated by the reference browser; and
for each browser having an identified difference in element collinearity, the ordered list of elements constructed from the DOM generated by the browser.

17. A method in a computer system to perform compatibility testing of a plurality of browser applications, the method comprising:
designating one of the plurality of browser applications as a baseline browser application;
for each browser application,
loading a web page;
capturing a screenshot of the loaded web page;
traversing a document object model (DOM) generated by the browser application from the loaded web page to construct a canonical representation, the canonical representation comprising a plurality of ordered elements of the loaded web page;
for each element in the canonical representation constructed from the DOM generated by the baseline browser application from the loaded page, determining whether an edge of the element is substantially collinear with an edge of another element;
for each edge that is determined to be substantially collinear to an edge of another element in the canonical representation constructed from the DOM generated by the baseline browser application from the loaded page, determining whether the corresponding edge of the corresponding element in the canonical representation constructed from the DOM generated by another browser application from the loaded page is substantially collinear with the other corresponding edge of the other corresponding element; and
if the corresponding edge is not collinear to the other corresponding edge, highlighting the element in the captured screenshot of the baseline browser application and the captured screenshot of the other browser application; and
including the screenshots in the generated report.

18. The method of claim 17 wherein at least two of the browser applications are different releases of the same browser application.

19. The method of claim 17 wherein the designated baseline application is specified by a user.

20. A computer-readable storage device having computer-executable instructions stored thereon, the computer-executable instructions comprising:
instructions to designate one of a plurality of browsers as a reference browser;
instruction to, for each browser,
load a web page;
traverse a document object model (DOM) generated by the browser from the loaded web page; and
based on the traversal, construct an ordered list of elements of the loaded web page;
instructions to, for each browser other than the reference browser, compare the ordered list of elements constructed from the DOM generated by the browser to the ordered list of elements constructed from the DOM generated by the reference browser;
wherein the comparison comprises:
for each browser other than the reference browser,
selecting a browser;
based on a selected traversal order, determining the longest intersection of the elements common to the ordered list of elements constructed from the DOM generated by the selected browser from the loaded web page with the ordered list of elements constructed from the DOM generated by the reference browser from the loaded web page, wherein the element intersection includes at least one pair of elements;
for each pair of elements included in the element intersection, determining whether an edge of a first element in the ordered list of elements constructed from the DOM generated by the reference browser is substantially collinear with an edge of a second element in the ordered list of elements constructed from the DOM generated by the reference browser; and
for each pair of elements determined to have substantially collinear edges when the web page is loaded in the reference browser,
for each browser other than the reference browser,
selecting a corresponding pair elements from the ordered list of elements constructed from the DOM generated by the browser;
determining whether corresponding edges of the corresponding pair of elements are substantially collinear;
identifying a difference in element collinearity when the corresponding edges are not substantially collinear; and
including the identified difference in the generated report of visual discrepancies;
instructions to, for each browser, query, the browser for scripting errors on the loaded web page; and
instructions to generate, based on the comparison, a report of the visual discrepancies in the web page as rendered by the reference browser and each other browser, wherein the scripting errors are included in the generated report.

21. A computer-readable storage device encoded with a data structure that is usable by a processor of a computer system to identify visual differences in a web page as rendered by different browsers, the data structure comprising:

a first ordered list of elements constructed from a document object model (DOM) generated by a first browser from the web page; and a second ordered list of elements constructed from a document object model (DOM) generated by a second browser from the web page, wherein, when the data structure is received by the computer system, the computer system compares position information of each corresponding element included in the first and second ordered lists of elements to identify visual differences in the web page as rendered by the first and second browsers, wherein the comparison of position information includes:

for each element in the DOM generated by the first browser from the web page, the computer system determines whether an edge of the element is substantially collinear with an edge of another element for each edge that is determined to be substantially collinear to an edge of another element in the DOM generated by the first browser from the web page, the computer system determines whether the corresponding edge of the corresponding element in the DOM generated by the second browser from the web page is substantially collinear with the other corresponding edge of the other corresponding element; and if the corresponding edge is not collinear to the other corresponding edge, the computer system identifies the non-collinearity of elements as a visual difference in the web page as rendered by the first and second browsers.

22. The computer-readable storage device of claim 21 wherein the data structure further comprises credentials to log into a web server hosting the web page.

* * * * *